(12) United States Patent
Ayers et al.

(10) Patent No.: US 7,769,487 B2
(45) Date of Patent: Aug. 3, 2010

(54) PROCESS AND ARCHITECTURE OF ROBOTIC SYSTEM TO MIMIC ANIMAL BEHAVIOR IN THE NATURAL ENVIRONMENT

(75) Inventors: Joseph Ayers, Nahant, MA (US); Jan Witting, Nahant, MA (US); Stephane Ryder, Del Mar, CA (US); Christopher Olcott, Lynn, MA (US)

(73) Assignee: Northeastern University, Boston, MA (US)

( * ) Notice: Subject to any disclaimer, the term of this patent is extended or adjusted under 35 U.S.C. 154(b) by 1338 days.

(21) Appl. No.: 10/898,673

(22) Filed: Jul. 23, 2004

(65) Prior Publication Data

US 2005/0065651 A1  Mar. 24, 2005

Related U.S. Application Data

(60) Provisional application No. 60/489,645, filed on Jul. 24, 2003.

(51) Int. Cl.
*G06F 19/00* (2006.01)
*B63H 1/30* (2006.01)
*B63H 1/36* (2006.01)
*B63H 19/00* (2006.01)

(52) U.S. Cl. ............... 700/245; 440/13; 440/14; 440/113; 901/1; 901/50

(58) Field of Classification Search ............ 440/13, 440/14, 113; 441/136; 446/14, 153, 487, 446/491
See application file for complete search history.

(56) References Cited

U.S. PATENT DOCUMENTS 6,089,178 A * 7/2000 Yamamoto et al. ......... 114/337
6,243,622 B1 * 6/2001 Yim et al. .................. 700/245
6,532,400 B1 * 3/2003 Jacobs ....................... 700/245
6,824,508 B2 * 11/2004 Kim et al. .................. 600/101
6,851,260 B2 * 2/2005 Mernøe ..................... 60/527
6,974,356 B2 * 12/2005 Hobson et al. ............. 440/13

OTHER PUBLICATIONS

Grasso et al., "Biomimetic robot lobster performs chemo-orientation in turbulence using a pair of spatially separated sensors: Progress and challenges", Robotics and Autonomous Systems 30 (2000), pp. 115-131.*

Witting et al., "SMA Actuators Applied to Biomimetic Underwater Robots", Neurotechnology for Biomimetic Robots (2002), pp. 117-135.*

* cited by examiner

*Primary Examiner*—Khoi Tran
*Assistant Examiner*—Nicholas Kiswanto
(74) *Attorney, Agent, or Firm*—Weingarten, Schurgin, Gagnebin & Lebovici LLP

(57) ABSTRACT

A robotic architecture for capturing the autonomous performance advantages the animal models enjoy in the natural environment is disclosed. A biomimesis process is employed to allow selective utilization of basic physical components and adaptation of a common control paradigm for each of different vehicle types. The biomimetic architecture involves five functional elements: a basic biomorphic plant for capturing the biomechanical advantages of the model organism; a neural circuit-based controller consisting of a finite state machine; myomorphic actuators producing linear graded force in response to trains of current pulses for mediating movements; labeled line code output by neuromorphic sensors; and a reactive behavioral sequencer executing command sequences defined within a behavioral library.

20 Claims, 25 Drawing Sheets

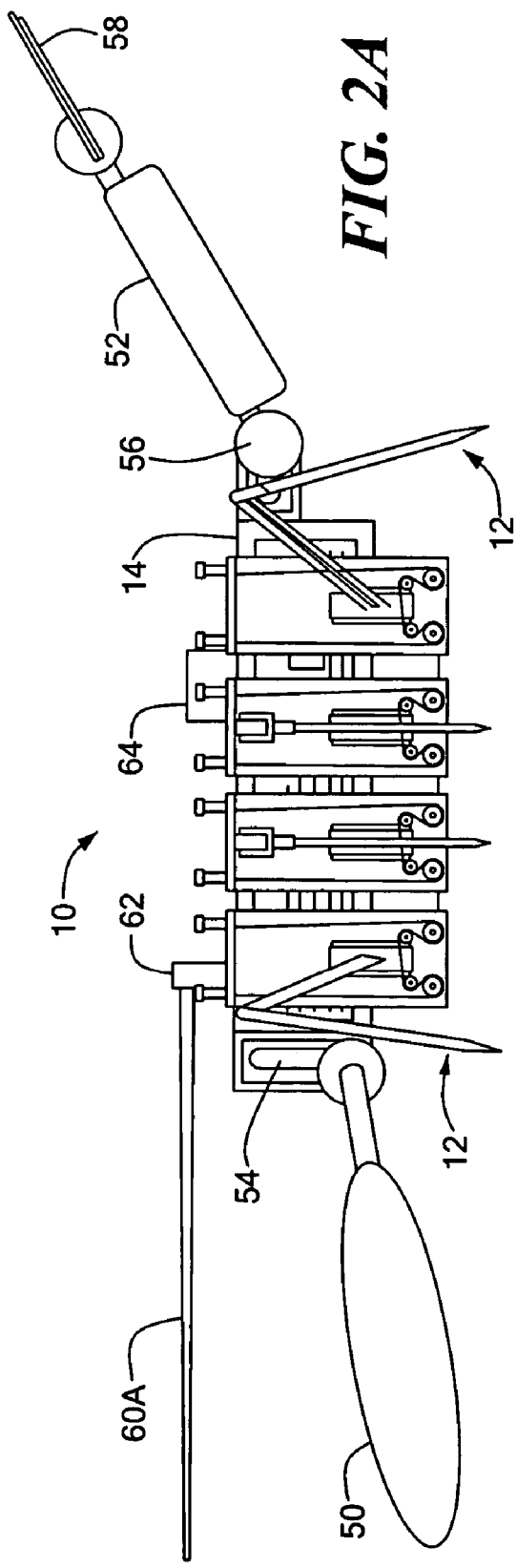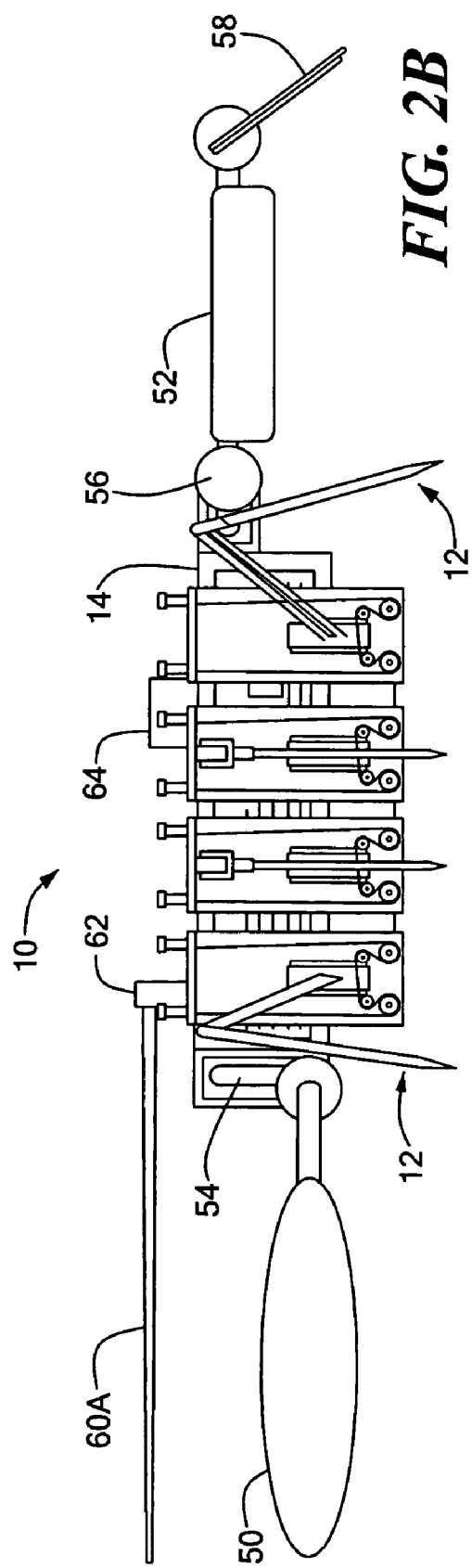

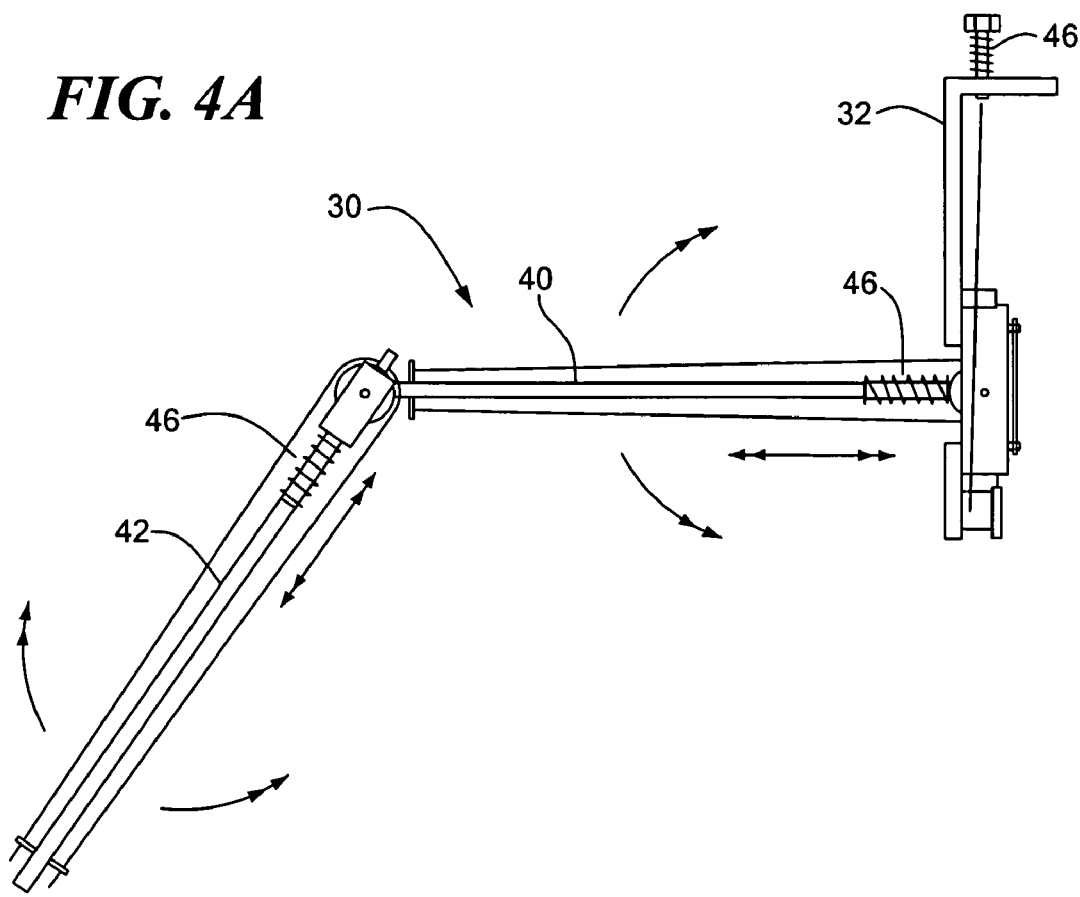
FIG. 4A
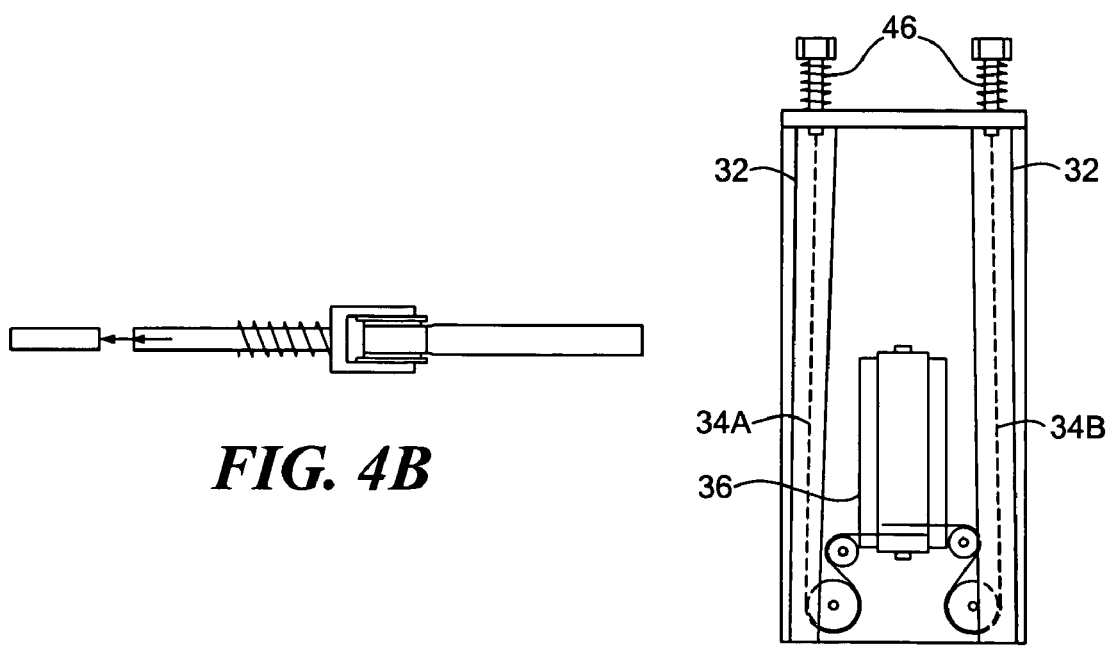
FIG. 4B
FIG. 4C

PROCESS AND ARCHITECTURE OF ROBOTIC SYSTEM TO MIMIC ANIMAL BEHAVIOR IN THE NATURAL ENVIRONMENT

CROSS REFERENCE TO RELATED APPLICATIONS

This application claims priority of U.S. Provisional Patent Application No. 60/489,645, filed Jul. 24, 2003, the entirety of which is incorporated herein by reference.

STATEMENT REGARDING FEDERALLY SPONSORED RESEARCH OR DEVELOPMENT

Part of the work leading to this invention was carried out with United States Government support provided by:

Defense Advanced Research Projects Agency (DARPA) and Defense Sciences Office (DSO) through Office of Naval Research (ONR) Grant No. N00014-98-1-0381;

DARPA through ONR Grant No. N00014-02-1-0428; and

ONR Grant No. N00014-04-1-0286.

Therefore, the U.S. Government has certain rights in this invention.

BACKGROUND OF THE INVENTION

Previous attempts to develop biomimetic robots required actuation and sensing to be performed by conventional technologies (e.g. motors, strain gauges, etc.). In particular, robots operating with conventional technologies require extensive analog-to-digital (A/D) and digital-to-analog (D/A) interfaces between the processor, sensors and actuators. These models have failed to employ neuronal codes derived from an analysis of the activity of neuronal circuits of the model animal. Thus, while certain anatomical likenesses have been employed in prior approaches, the control methodologies employed have not been premised upon the innate behavior of the animal in nature.

BRIEF SUMMARY OF THE INVENTION

The presently disclosed invention is a robotic architecture instantiated, for purposes of illustration, as two different robots, each capturing the autonomous performance advantages that the animal models enjoy in the natural environment. The two robots are: 1) a lobster-based ambulatory robot; and 2) a lamprey-based undulatory robot. Each robotic system comprises an operational architecture that relies on reverse engineering of model animal systems and a basic physical architecture which can be modified to implement a variety of biomimetic robots that combine ambulatory, undulatory or other types of propulsion, depending upon the respective model animal.

To build robots based on animal models, a biomimesis process is employed. This process allows the selective utilization of physical components and adaptation of a basic control paradigm for each of different vehicle types. The biomimetic architecture involves five different functional elements.

First, a basic biomorphic plant for each robot captures the biomechanical advantages of the model organism by using the general body form and appendage set of that organism.

Second, the brain of the robot is a neural circuit-based controller that consists of a finite state machine. The state machine incorporates a command neuron, a coordinating neuron and a central pattern generator model that controls actuators throughout the biomorphic plant.

Third, the system utilizes myomorphic actuators. These actuators are artificial muscle-based linear actuators that produce linear graded force in response to trains of current pulses for mediating the movements of the robot.

Fourth, the processes that trigger or modulate behavior as a result of environmental inputs, referred to herein as "releasers," are embodied in labeled line code which is output by neuromorphic sensors. The robot sensors code environmental information in the same fashion as the sensors of the model organism and readily interface to the neural circuit-based controller. The labeled line coding quantizes the timing, amplitude, and orientation of the input stimulus. As in the model organism, the sensory modalities are orientated relative to gravity, direction and contact.

Finally, to achieve reactive autonomous behavior, a reactive behavioral sequencer executes sequences of commands defined within a behavioral library. The contents of the library, indexed by releasers, are based on reverse-engineered behavior of the animal model. These commands control the robot subsystems by modulating the internal state variables that specify ongoing behavior. The queue-based behavioral sequencer reactively selects behavioral sequences in response to sensor-mediated releasers. As will be discussed, the behavioral sequencer not only queues commands according to the relevant releasers, but also has the capability of adapting already-enqueued commands on the basis of subsequently identified commands.

The robotic system is based on reverse-engineered animal model systems that operate with impunity in the candidate operational environment of the robot. Due to the underlying neuronal network architecture, the controllers are extensible to the entire behavioral repertoire of the animal model.

The robot system is autonomous. A robot system can perform missions under supervised autonomy; for instance, it can, in conjunction with a lane marking system, function as an organic mine hunting system for operation in cluttered littoral environments.

In another aspect of the presently disclosed invention, an improved method for forming an artificial muscle from a shaped memory alloy (SMA) material is disclosed. Using an appropriate band of crimping material, a loop of SMA is formed at one end which enables simple mechanical connection to a lightweight, high strength fiber serving as an artificial ligament for interfacing the SMA muscle to a mechanical support. An electrically-conductive interface to a voltage supply is also provided for selectively heating the SMA material, whereby contraction occurs.

BRIEF DESCRIPTION OF THE SEVERAL VIEWS OF THE DRAWINGS

The invention will be more fully understood by reference to the following detailed description of the invention in conjunction with the drawings, of which:

FIGS. 2A and 2B are side elevation views of the robot of FIG. 1;

FIGS. 4A, 4B, and 4C are detailed views of a leg appendage of the robot of FIG. 1;

DETAILED DESCRIPTION OF THE INVENTION

Figure 1:
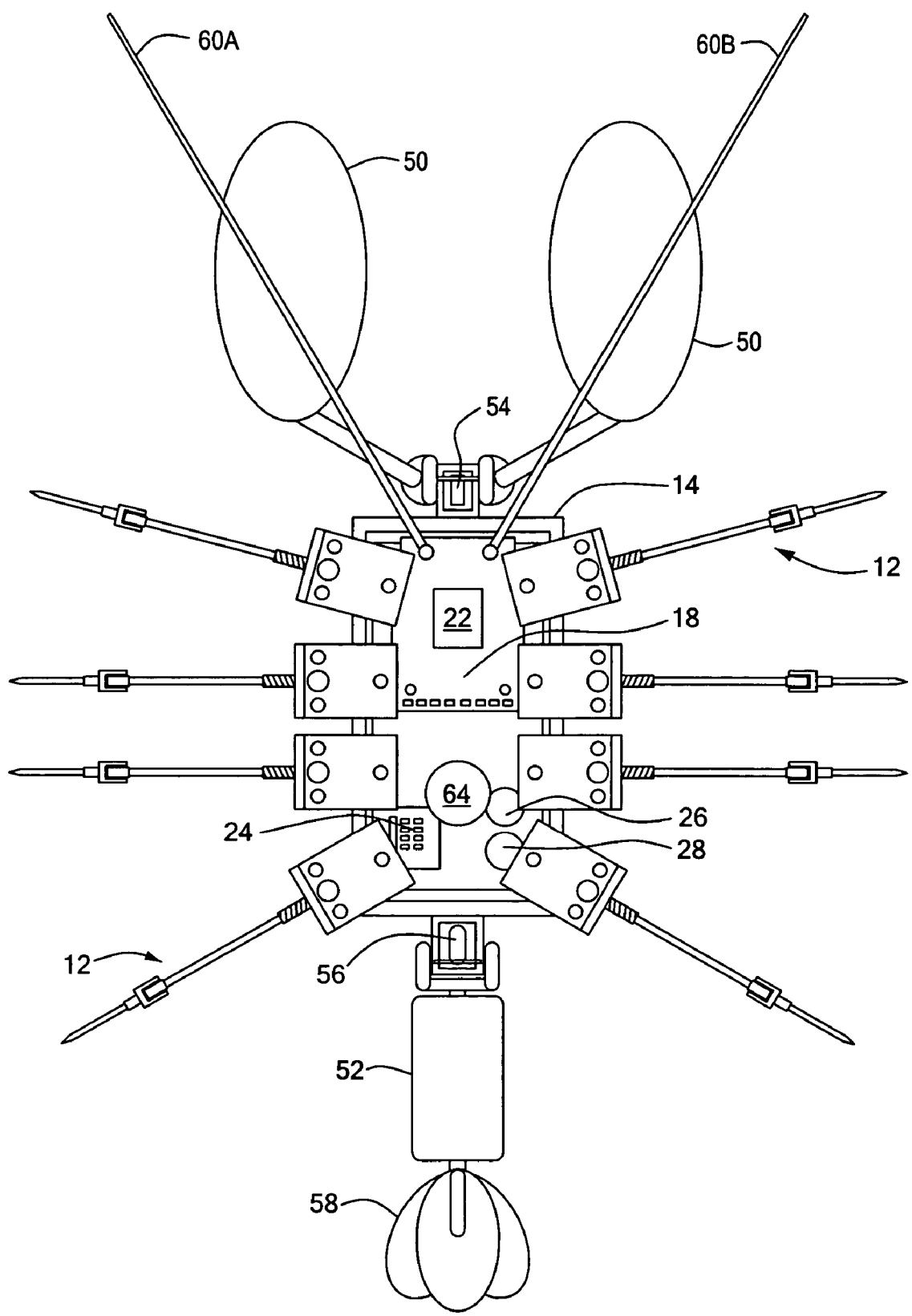
FIG. 1 is a plan view of an ambulatory lobster-based biomimetic robot developed according to the principles of presently disclosed invention.
Figure 3A:
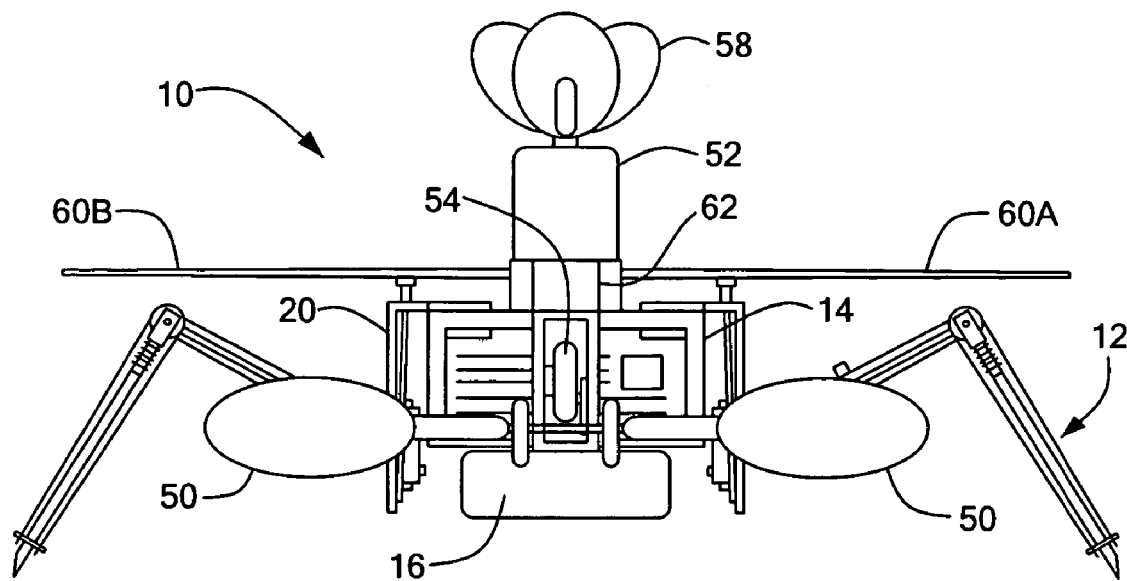
FIGS. 3A and 3B are front and rear elevation views of the robot of FIG. 1.
Figure 3B:
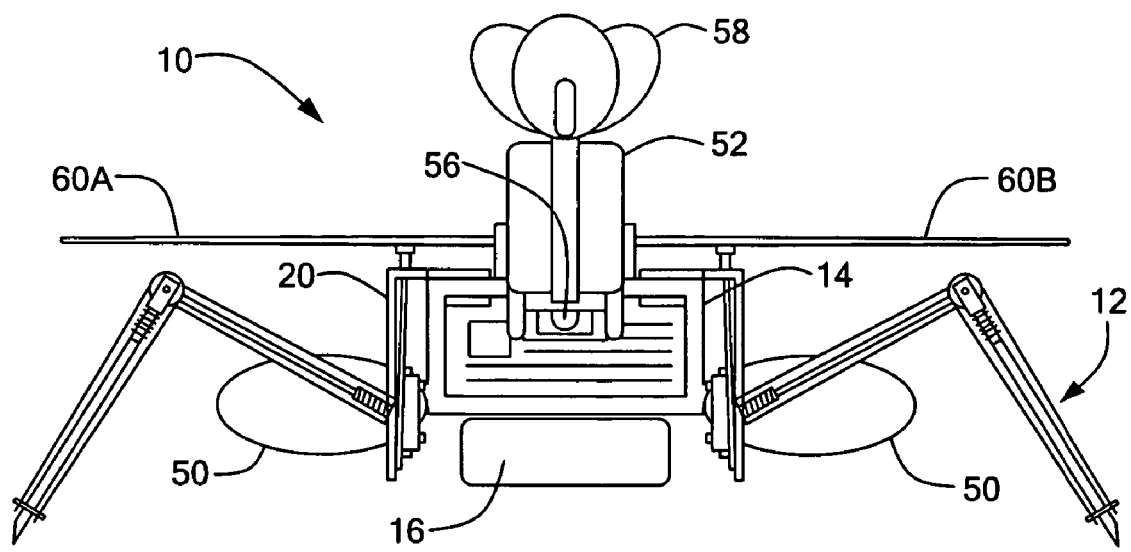
Figure 6:
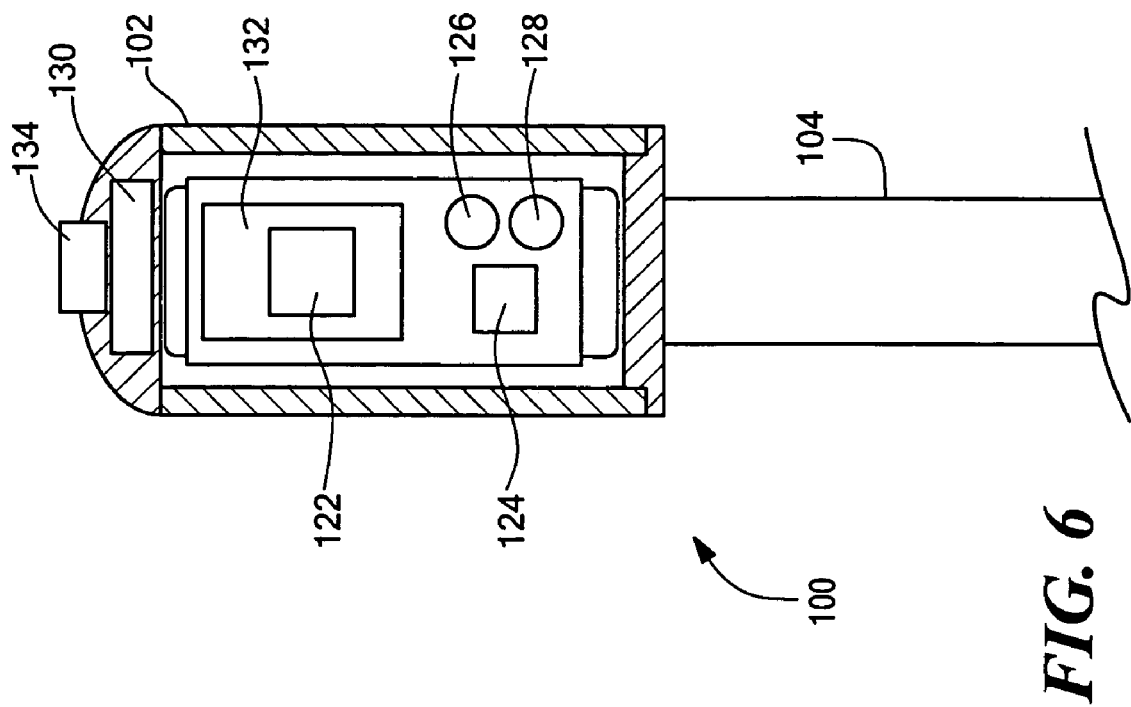
FIG. 6 is a detailed view of a hull portion of the robot of FIG. 5.
Figure 5:
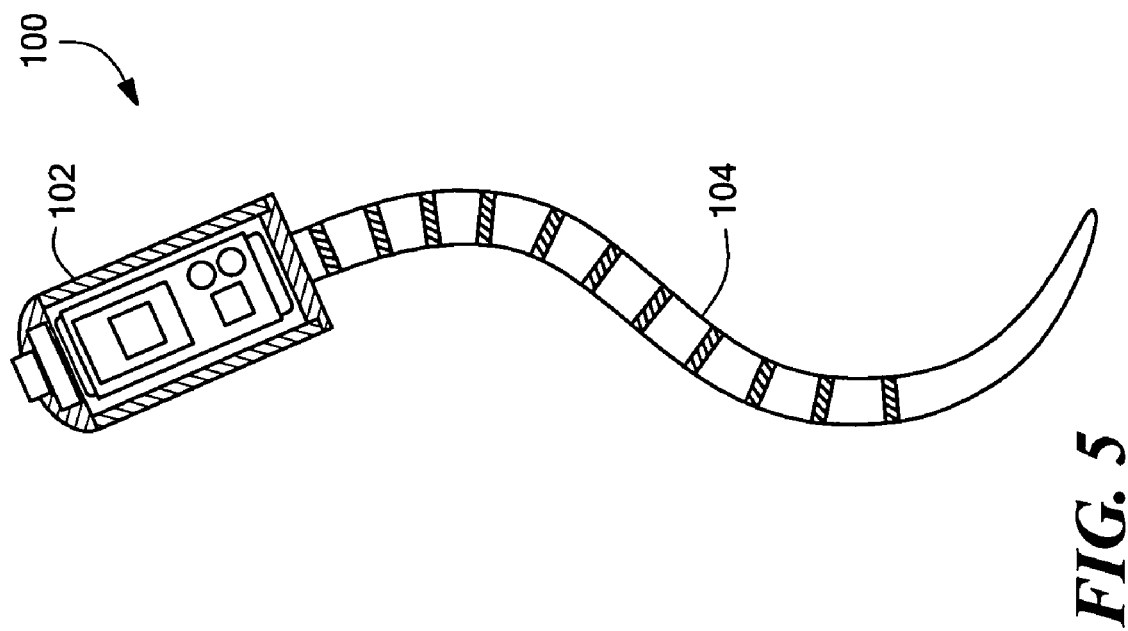
FIG. 5 is a plan view of an undulatory lamprey-based robot developed according to the principles of the presently disclosed invention.

A biologically-based robotic architecture consists of five principal components, each to be described in detail below. These components are: a biomorphic plant; a neural circuit-based controller; myomorphic actuators; neuromorphic sensors; and a reactive behavioral sequencer.

(1) Biomorphic Plant

The biomorphic plant, or biomimetic or physical plant, is the vehicle structure which is based on an animal model adapted to a particular niche. The vehicle plants are typically composed of a hull, power supply, locomotory effectors, control surfaces and appendages, and adaptive sensors, which are generalized, and in many cases conserved among animal groups. The plant differs for underwater versus terrestrial applications with regard to the need for hydrodynamic control surfaces and a watertight electronics bay. In addition, the impact of buoyancy provides different requirements of actuator force necessary to mediate support against gravity versus translational propulsion. Due to their conservative organization, component modules are assembled in different combinations to mimic different animal models. For example, an alligator-based robot combines both undulatory and ambulatory effectors.

The embodiments of the robotic systems described herein are specific examples of how the general techniques, processes, materials, etc., are practiced to devise biomimetic robotic systems. A wide variety of robots may be realized according to the general structure and concepts described above and utilizing variations on the specific implementations described below.

a. Lobster-Based Ambulatory Robot

With respect to FIGS. 1 through 3B, the lobster vehicle 10 developed according to the presently disclosed biomimetic approach use walking legs 12 having three degrees of freedom to mediate locomotion. The legs are attached to an electronics bay or hull 14. An external or internal battery pack 16 is also provided in one embodiment, whereas in another tethered embodiment, power is received via watertight tether (not illustrated). The electronics bay is a water tight box with a machined lid and o-ring seal to facilitate access to the electronics components. The lid of the hull features a light-emitting diode (LED) 18 that can be used to indicate the status of the vehicle, such as water in hull, received sonar command, etc., for external inspection. An external flange 20 allows the leg assemblies to be mounted on the hull independently. Each leg has a water-tight electrical feed-through that allows leg assemblies to be changed out rapidly.

Two generations of lobster-based ambulatory robots have been developed for operations in, for instance, the littoral zone of the ocean, harbors, estuaries, and rivers. One embodiment of the ambulatory robots uses external power and may be tele-operated via a float and RF modem communications link. The other has onboard power 16, an embedded controller 22 and is capable of supervised autonomous operation via a sonar interface.

The watertight hull contains a motherboard, leg current driver boards, a motor controller board, a sonar board, and current drivers for the trim appendages. The motherboard houses power management circuitry, the compass 24, and pitch and roll inclinometers 26, 28.

Figure 9:
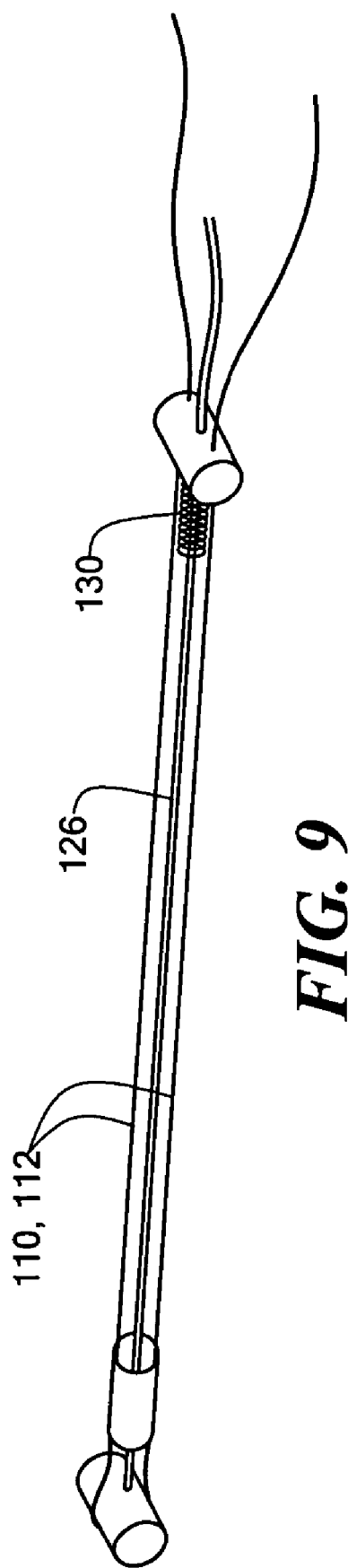
FIG. 9 is a detailed view of an actuator system as used in the robots of FIGS. 1 and 5.

With respect to FIGS. 4A through 4C, eight modular walking leg assemblies 30 are attached to a flange 20 on the hull 14 in the lobster-based ambulatory embodiment. Each leg assembly is composed of vertical posts 32 that contain muscle modules 34A, 34B that protract and retract the leg around a capstan 36 that supports the more distal joints. Two other segments 40, 42 house paired antagonistic actuators that cause elevation/depression and extension/flexion. As shown in FIG. 9, a leg segment preferably comprises a myomorphic muscle beginning and ending at one point and looped around another point. In FIG. 9, these points are cylindrical. In FIG. 4A, the termination point is provided as a plate to which the muscle is attached and the other point is a pulley. Further still, the muscle may be fixed to the beginning and ending point via KEVLAR (E. I. du Pont de Nemours Company, Incorporated) ligaments further described in the context of FIG. 19. Leg segments house springs 46 that prevent overstress of artificial muscle actuators and provide some measure of compliance.

A separate battery compartment 16 that fits in a sliding flange contains the battery packs. During development, the system has been powered by nickel metal-hydride rechargeable batteries, though mission length can be increased substantially by use of lithium ion-polymer batteries. One skilled in the art will realize that a variety of battery technologies can be adapted for use in the disclosed biomimetic robot architecture.

Anterior 50 and posterior 52 hydrodynamic control surfaces analogous to the claws and abdomen of the lobster are controlled in pitch by DC motors 54, 56 operating through jackscrew assemblies. Separate nitinol shaped memory alloy (SMA) actuators (not illustrated) control the yaw of the anterior surfaces and pitch of the tail fan 58. A pair of antennae 60A, 60B can be positioned at one of four yaw orientations or can be swept between any of the four positions by a separate DC motor/gear arrangement 62. The antennae each have cooperating gears such that rotation of one antenna in one rotational direction results in a complimentary rotation of the other antenna in the opposite rotational direction.

The external battery bay 16 is mounted on the lower surface of the hull 14 with a sliding flange allowing the battery to be changed out without opening the electronics bay pressure vessel. One of the major sources of variability in the performance of the vehicle during testing was the fact that when large numbers of nitinol actuators were activated in parallel, the effective load of the actuators became lower than that of the conductor connecting the batteries to the power FETs. To address this problem, the battery bay was configured to have four separate power circuits, one for each of the leg power boards (discussed subsequently). Thus, in one embodiment, the power supply consists of twenty-nickel metal hydride batteries arranged in four parallel sets of five batteries in series. This arrangement provides a separate 6.5V power supply for each of the four leg driver boards and minimizes the current in any one circuit. The total load of the motherboard is relatively low and is accommodated by one of the four battery circuits. The battery pack is connected to the electronics bay by an external cable (not illustrated) with four parallel sets of conductors. Two watertight connectors allow the battery pack to be changed out rapidly. Tests indicate that the nickel metal hydride batteries used in the disclosed lobster-based ambulatory robot have a life of about 50 minutes to 1.5 hours, depending on operations.

There are separate hull feed-throughs for the wires to the drive motors for the claw and tail pitch control motors on the front and rear surfaces of the hull (not illustrated). A third hull feed-through allows the serial bus to be connected to an external laptop to allow reprogramming and/or external operation for debugging purposes. The lid of the pressure vessel houses a sonar transducer 64 and the antenna drive motor 62. Two additional feed-throughs pass the sonar leads, the motor controls, and the returned signals from the antenna strain gauges through the lid.

Within the hull are a number of internal interface circuit boards: a motherboard; an actuator control or leg driver boards; a controller board; and a motor-driver board.

One embodiment of the lobster-based ambulatory robot 10 uses a board set based on surface mount technology. The interface boards are plugged into a motherboard that contains the serial bus, the pitch and roll inclinometers 26, 28 and the compass 24. The motherboard also houses a moisture sensor that reports leaks through an LED 18 mounted on the electronics bay lid. The motherboard also has circuitry to interface to a thermistor (not illustrated) to allow modulation of the pulse width duty cycle lookup tables (LUTs) relative to the temperature of the external seawater. The motherboard has slots for seven interface boards.

The leg driver or actuator control boards house the power control circuitry to drive one pair of leg modules 30. These boards implement the recruiter that allows the graded actuation of nitinol muscle contractions. These boards are the high current pathway between the batteries and the nitinol artificial muscle actuators. In one embodiment, the on-board circuitry consists of a serial bus that connects the board to the controller, a peripheral interface controller (PIC) microcontroller that generates the pulse trains that energize the nitinol actuators, power FETs, and a separate power bus from the batteries.

On each actuator control board, there are six external jacks that connect the board to the respective leg modules 30. Each jack contains the control wires to two actuators that operate each of the three leg joints 36, 40, 42. The leg driver board receives vectored serial commands to turn on or turn off a current pulse train to one actuator element. As shown in FIG. 9, the pulse trains can have one of three pulse width duty cycles levels specified as low, medium, and high (L, M, H) depending upon the control signal. The actual duty cycle associated with each level can be adaptively assigned by the controller to modulate the intensity of leg movements associated with each duty cycle level.

As will be appreciated by one skilled in the art, the specific implementation of the actuator control boards may be varied as long as the fundamental goal, instantiating electronic neurons through a pulse width duty cycle varying-circuit responsive to byte commands from a controller, is realized.

The brain of the robot is housed in a separate controller board that supports a Persistor Instruments Inc. microcontroller 22. The microcontroller is a 3-volt Motorola, Inc. 68020 microprocessor with a compact flash memory module. The board connects the microcontroller serial ports to the serial bus of the motherboard. The board also houses a voltage regulator to reduce the 6.5V power coming from the motherboard to the processor Vcc. The Motorola processor is supported in the Metrowerks CodeWarrior programming environment (both PC and MAC compatible) through a cross-compiler library and is programmed in the C programming language. The code can be downloaded from the laptop through the serial bus or transferred directly to the compact flash memory module using a PCMCIA adapter in a laptop computer, for example.

The motor driver board performs several functions. First, it has controllers for the drive motors for the claw pitch 54, the tail pitch 56 and the antenna yaw 62. Secondly, it provides an interface to the antennal strain gauge sensors (not illustrated) and quantizes the sensor output into a labeled line code. Third, the board provides an interface to up to four bump sensors. Finally, the board provides an analog interface to monitor the battery levels of the four power circuits. The motor driver board supports a Wheatstone Bridge daughter board to interface to the antennal strain gauges. In addition to the connection to the serial bus, the board has three connectors for the motors, two connectors for the antennae and a connector for the bump circuits and battery monitors.

The motor driver board receives vectored serial commands from the controller 22 to move the antennae motor 62 to one of four positions and the claws and tail motors 54, 56 to one of three positions. In addition, the motor board can receive a calibration command to move the motors to a mechanical stop to zero the motor position and another command to reset the motors to their "rest" position.

The motor driver board can be polled to report data from the antennae 60A, 60B, the bump sensors, or the battery monitors. The antennae signal is discreetized into three degrees of bending to the left or right as well as a rest position. The antennal interface also monitors the antennal signal to look for rapid (e.g. <150 msec) deflections to the left or right which are characteristic of the buckling that occurs in the antennae in response to head on collisions.

The interface boards communicate with the central processor 22 or a laptop through the serial bus. This can be achieved through reading and writing to shift registers or in one embodiment by reading and writing byte codes to a small PIC microcontroller and distributing or collecting the signals over the logic pins of the processor. This allows the user to substitute a laptop for the embedded controller for debugging. Since all peripheral events are on/off (i.e. labeled line sensors are one bit and different bits gate on current drivers at different pulse width duty cycles), single bytes can contain both board address and data. There are 256 possible sent commands and 256 possible received sensor responses. The sent commands include the ability to turn a nitinol actuator on or off at one of three pulse width duty cycles, the ability to move the claws 50, tail 58, or antennae 60A, 60B to different positions, the ability to request sensor data or sonar commands in one of seven formats, the ability to set or clear an external LED 18, and the ability to set the pulse-width duty cycle LUTs to different duty cycles. Received data include one and two byte frames from the compass 24, inclinometers 26, 28, antennae, and contact sensors, as well as acoustic commands from the sonar sensor 64. The bit masks associated with these returned bytes are described below.

b. Lamprey-Based Undulatory Vehicle

With respect to FIGS. 5 through 9, the lamprey-based undulatory robot 100 is suited for operations in, among others, the water column of the ocean or relatively still bodies of water. In one illustrative embodiment, it consists of a watertight hull 102 that is 12" (0.3 cm) long and 4" (0.1 cm) in diameter and a 24" (0.6 cm) long undulatory actuator system 104.

Figure 7A:
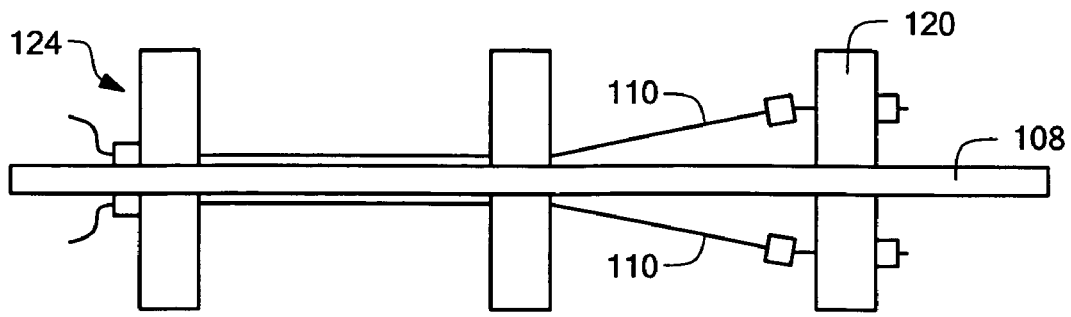
FIGS. 7A and 7B are top and side views of an undulation module of the robot of FIG. 5.
Figure 7B:
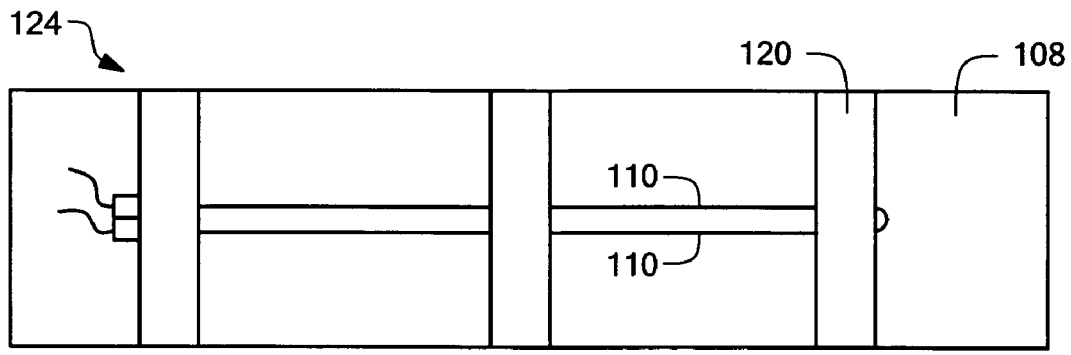
Figure 8:
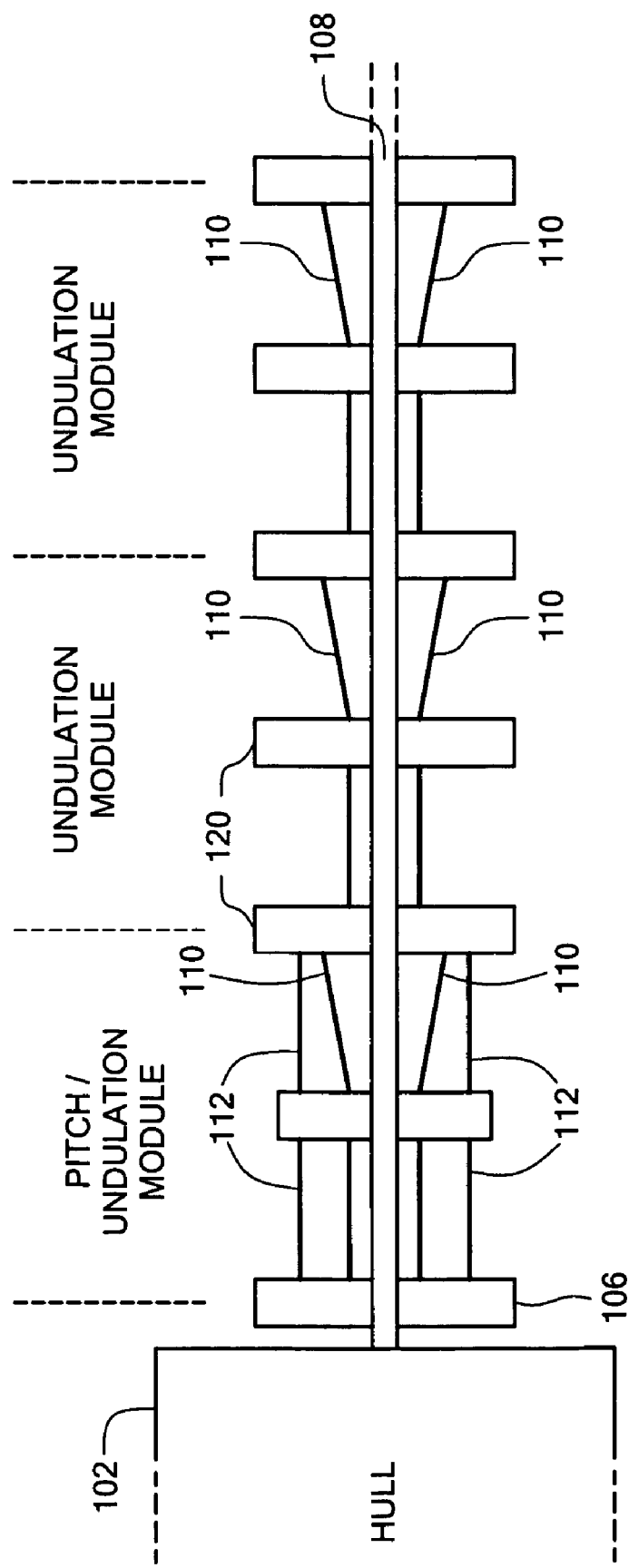
FIG. 8 is a top view of a portion of an undulatory actuator system of the robot of FIG. 5.

The illustrative vehicle weighs about three pounds (1.36 kg) in air but less than 100 grams in water when properly ballasted. Swimming thrust is generated by lateral axial undulations that propagate from rostral to caudal segments. With reference to FIGS. 7A, 7B, and 8, these undulations are generated in the illustrated embodiment by five undulatory modules 124 each comprising pairs of TEFLON (E.I. du Pont de Nemours and Company Corporation)-insulated SMA wire (0.006"/0.15 mm dia.) muscle modules 110 that are activated in a pattern that features a 20% phase lag from anterior to posterior segments and a 50% phase lag between the two sides. Each undulatory module includes two end and one central ribs 120, which in one embodiment are formed as paired TEFLON semicircles disposed one either side of a continuous strip of polyurethane which forms the spine 108 of the undulatory actuator system 104. KEVLAR (E.I. du Pont de Nemours and Company Corporation) strands 126 and springs 130 may be used to limit the length of travel of each muscle module. In an illustrative embodiment, the polyurethane spine is 0.125" (3.175 mm) thick and 1.25" (31.75 mm) high.

Figure 7C:
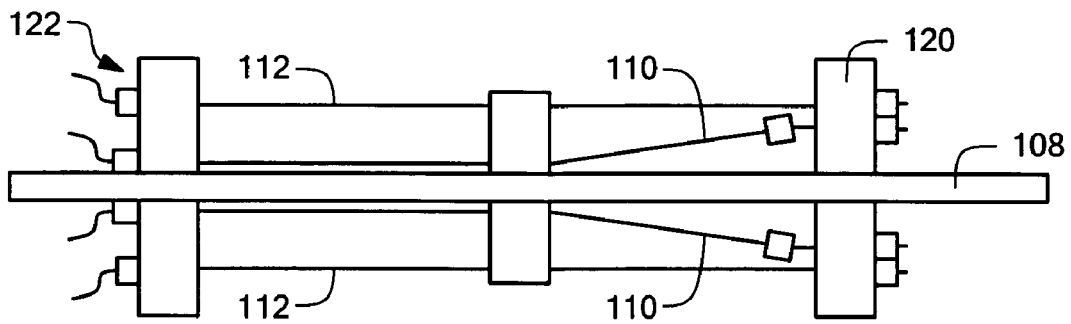
FIGS. 7C and 7D are top and side views of a pitch/undulation module of the robot of FIG. 5.
Figure 7D:
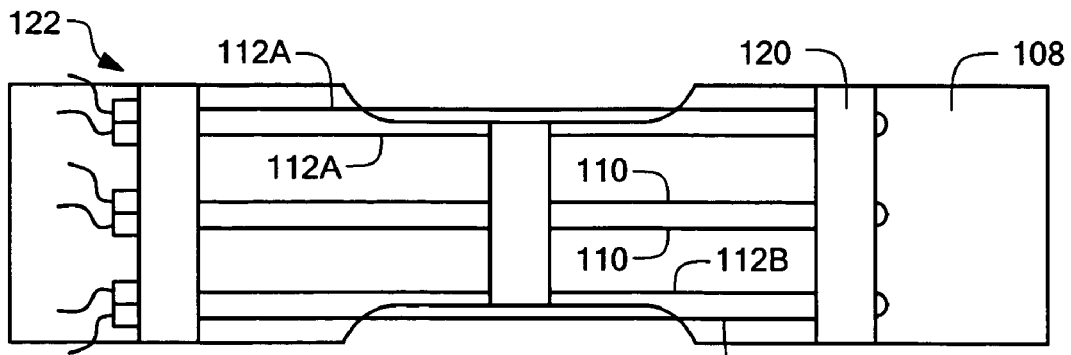

The hull is coupled to the actuator system 104 by a coupling 106 that allows the pitch of the hull 102 to be altered relative to the actuator system 104. FIGS. 7C, 7D and 8 illustrate a pitch/undulation module 122 which is in mechanical contact with the coupling 106. Muscle modules 112A, 112B are selectively contracted to realize pitch variation. Pitch alterations develop a low pressure area above or below the hull to allow the vehicle to dive and climb.

The undulatory vehicle 100 shares much of the electronics with the ambulatory vehicle 10 described above. For example, the actuator control board that actuates each pair of legs in the ambulatory vehicle drives the entire set of nitinol actuators for the undulatory vehicle. Similarly, the pitch and roll inclinometers 126, 128 and the compass 124 in the mother board of the undulatory vehicle is essentially the same as those used in the motherboard for the ambulatory vehicle, as can the sonar communications board 130 and the controller board 132. A sonar transponder 134 is in communication with the sonar communications board through a watertight connection.

Typical values for the operational environment of the disclosed undulatory robot 100 embodiment include the following:

Littoral zone depth range: 0 to 50 feet;
Operational temperature: 15 to 25 degrees C.;
Operational current speeds (max.): 10 to 15 cm/sec;
Mission length (approx.): approx. ⅕ hours; and
Forward speed (max.): 15 cm/sec.

The anterior hull 102 can mount a variety of sensor packages with capabilities for active pitch and yaw control subject to orientation of the vehicle.

Basic maneuverability in the illustrative undulatory robot 100 is provided by executing the following:

Cold start and climb from bottom;
Swimming on an arbitrary heading at one of three speeds;
Turning contraction amplitude modulation on the two sides;
Climbing and diving; and
Maintaining orientation in pitch and roll planes.

(2) Neural Circuit-Based Controller

In the following, a neural circuit-based controller adapted for use in the lobster-based ambulatory, robot 10 is described. A similar controller is adapted for use in the lamprey-based undulatory robot 100, though such is not described in detail in the following.

Figure 11:
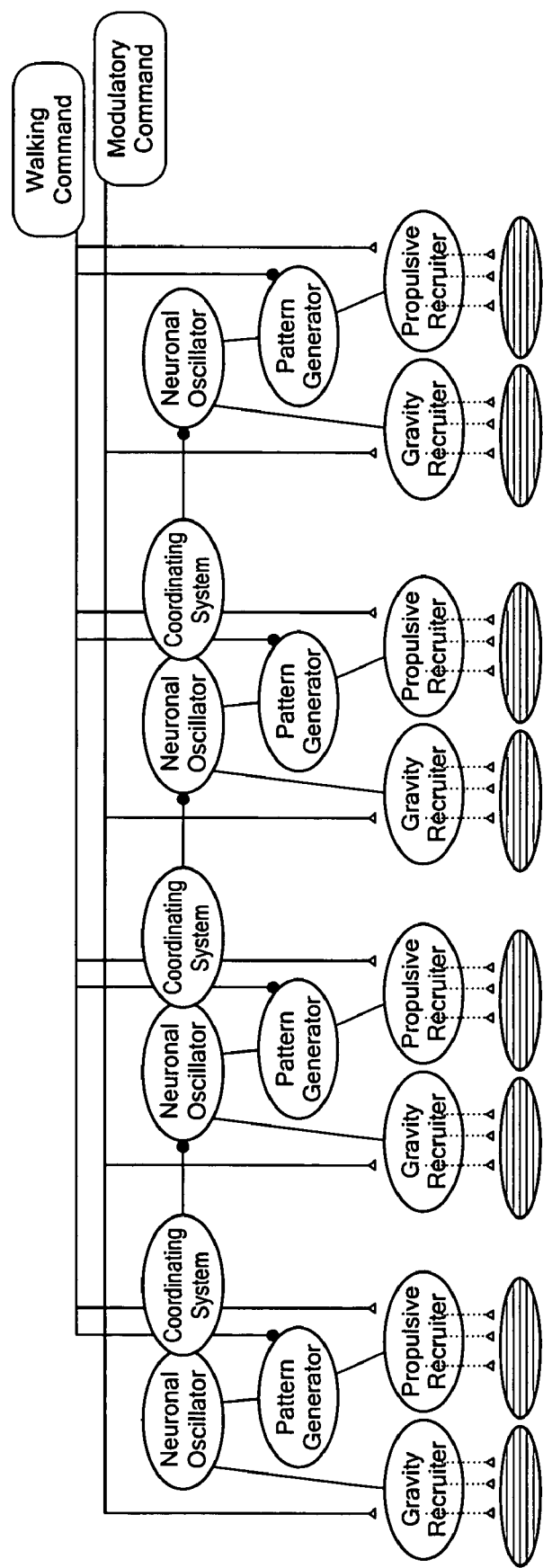
FIG. 11 is an organizational depiction of the controller architecture employed in the robot of FIG. 1.

With reference to FIG. 11, the neural circuit-based controller 22 of the ambulatory vehicle is based on the neuronal networks that mediate locomotion, sensing, and navigation in the model organism, the lobster. These networks have been abstracted to functional objects and integrated in a distributed controller that features separate state machines for each walking leg 12, the anterior and posterior hydrodynamic control surfaces 50, 52, 58, and the antennae 60A, 60B. The operational state of the appendages is specified by a set of eleven internal state variables that configure the appendage state machines on the fly.

In parallel with the optimization of the nitinol artificial muscle actuators, development and optimization of the behavioral-based controller mediates stable adaptive locomotion and reactive navigation. The controller divides the step cycle of the electrically activated artificial muscle into nine epochs: heating (which results in contraction); contraction maintenance; and cooling for each of the step phases of early swing, late swing and stance. This is integrated with the stack-based command sequencer.

Figure 13:
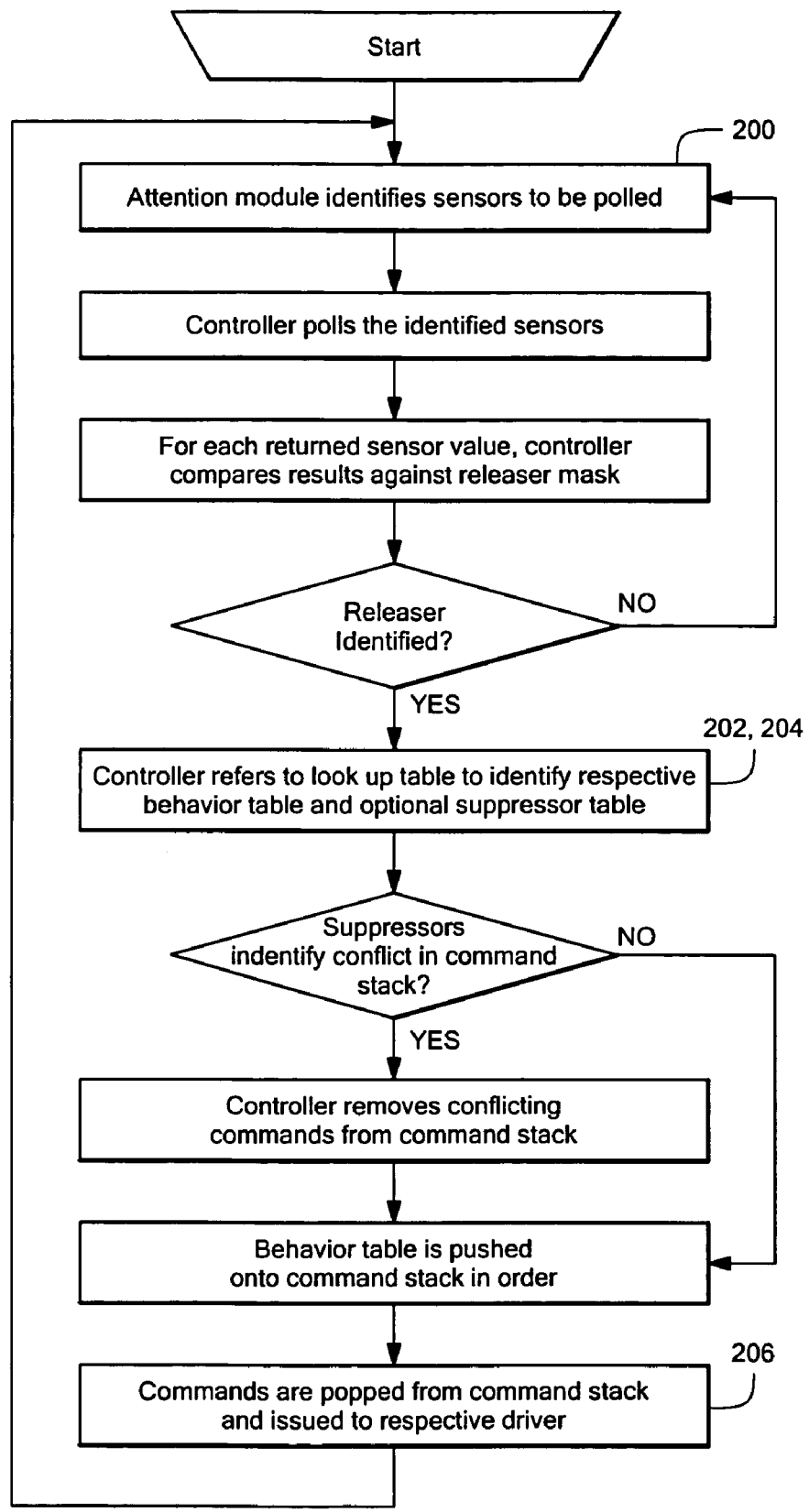
FIG. 13 is a flow chart illustrating an event loop performed by a controller of the robots of FIGS. 1 and 5.

The basic structure of the controller is a real-time loop, illustrated in FIG. 13, that polls sensors 200, manages the command stack 202, selects behavioral acts 204, and updates the leg state machines 206. An attention module polls each of the sensors at a different rate depending on behavioral context.

The attention module keeps a list of the clock times at which subsequent sensor polls are to occur in temporal order and updates this list every time a sensor is read. When a sensor is polled, the result is compared to a list of byte masks defining particular releasers. For example, if an antennal poll detected that the left antennae is bending medially and the right antennae is bending laterally this would constitute the predefined releaser for a rheotaxic rotational turn to the left.

When the attention module identifies a behavioral releaser, a look-up table is used to identify a behavioral state table associated with that particular releaser. The behavioral state tables are stored as resources in the external development program or preferably as separate files in the embedded microcontroller.

Whenever a releaser is identified, the sequencer sets up the sequence of command state changes that mediate the evoked behavior. The sequencer actually performs two tasks. First, the releaser may be used by the microcontroller to identify a suppressor or table of incompatible action components. For example, if the evoked behavior involves forward walking, any instances of backward walking command components must be cleared from the command stack. This suppressor action is the locus of implementation of behavioral choice between incompatible commands. Second, the releaser sets up the appropriate behavior by pushing the behavioral state table on the command stack in temporal order.

Animals can evoke behavioral acts at different levels of intensity. This is typically mediated by neuromodulators. The behavioral sequencer allows the command state transitions to be pushed on the stack at different temporal compressions in order to vary intensity. In addition, the pulse width duty cycles associated with the low, medium and high levels of recruitment of the nitinol actuators can be varied (see FIG. 10). Thus, at high intensity, the sequence of command state changes are compressed on the stack and the recruitment state pulse width duty cycle mapped to a high level of intensity. In contrast, at low intensity the sequence of command state changes are expanded on the stack and the recruitment state pulse width duty cycle mapped to a low level of intensity.

Figure 12:
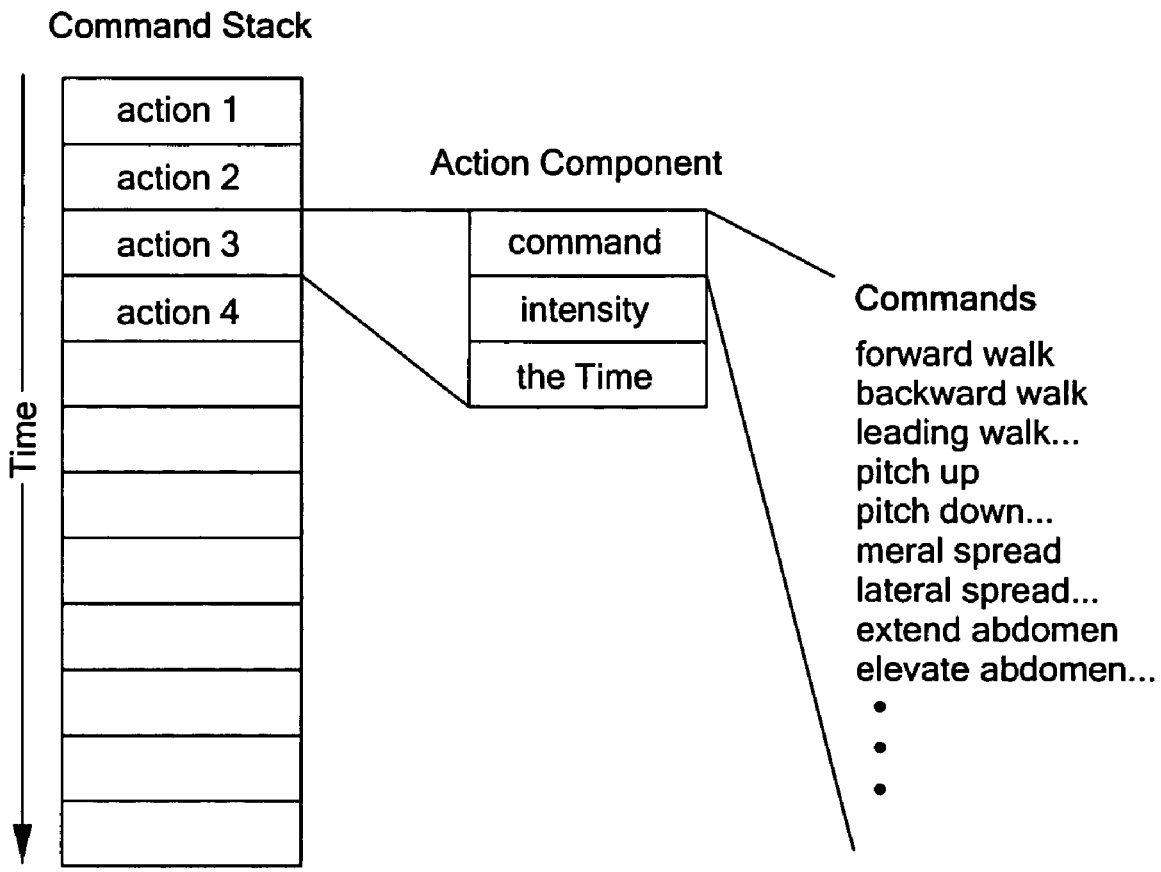
FIG. 12 illustrates a linked list command stack as employed in the robots of FIGS. 1 and 5.
Figures 23, 24:
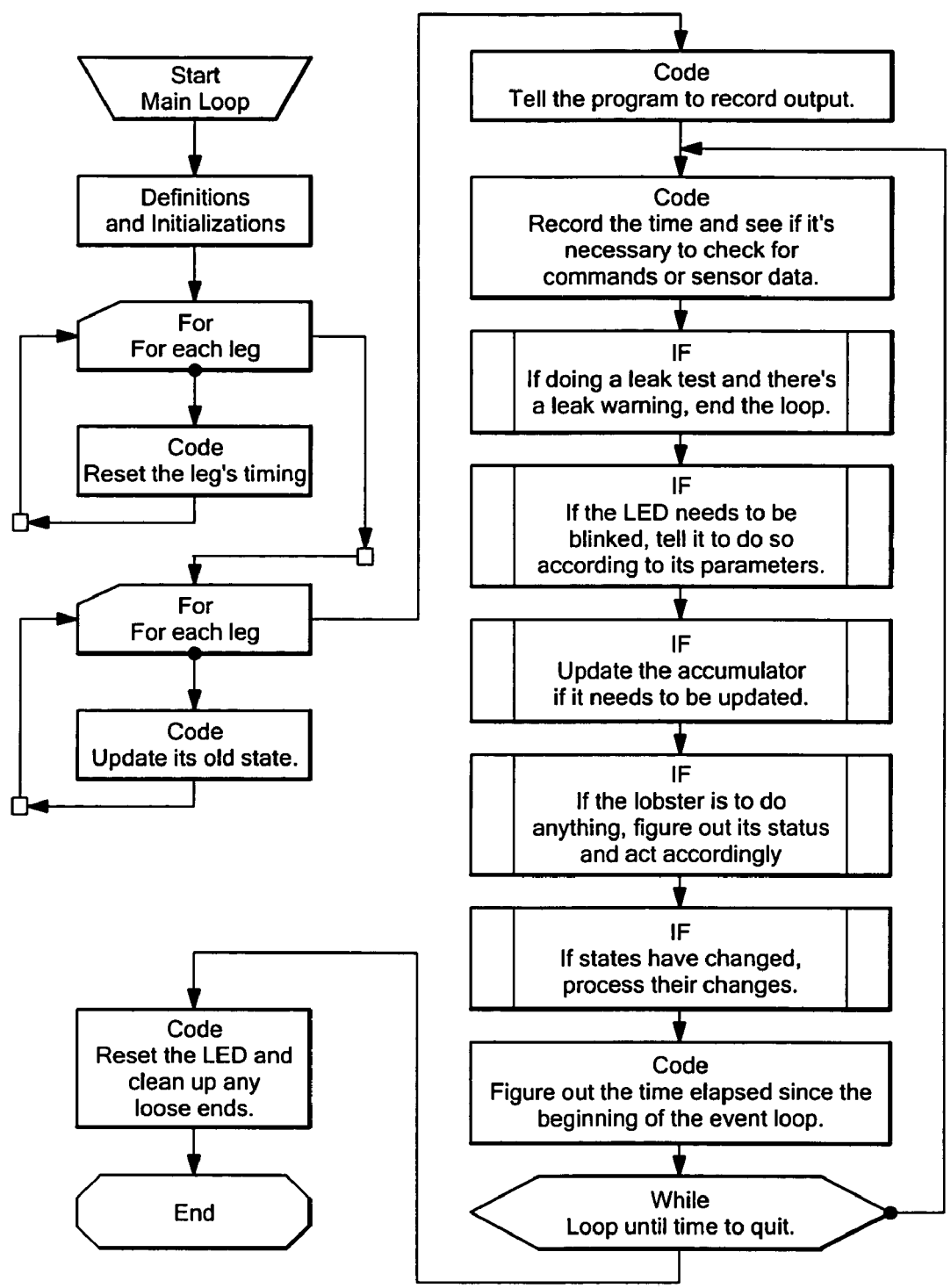
FIG. 23 is a flowchart depicting an initialization sequence performed by the controller of the robot of FIG. 1.
FIG. 24 is a flow chart illustrating a range of possible command sequences which can be commanded within the robot of FIG. 1.
Figure 24A:
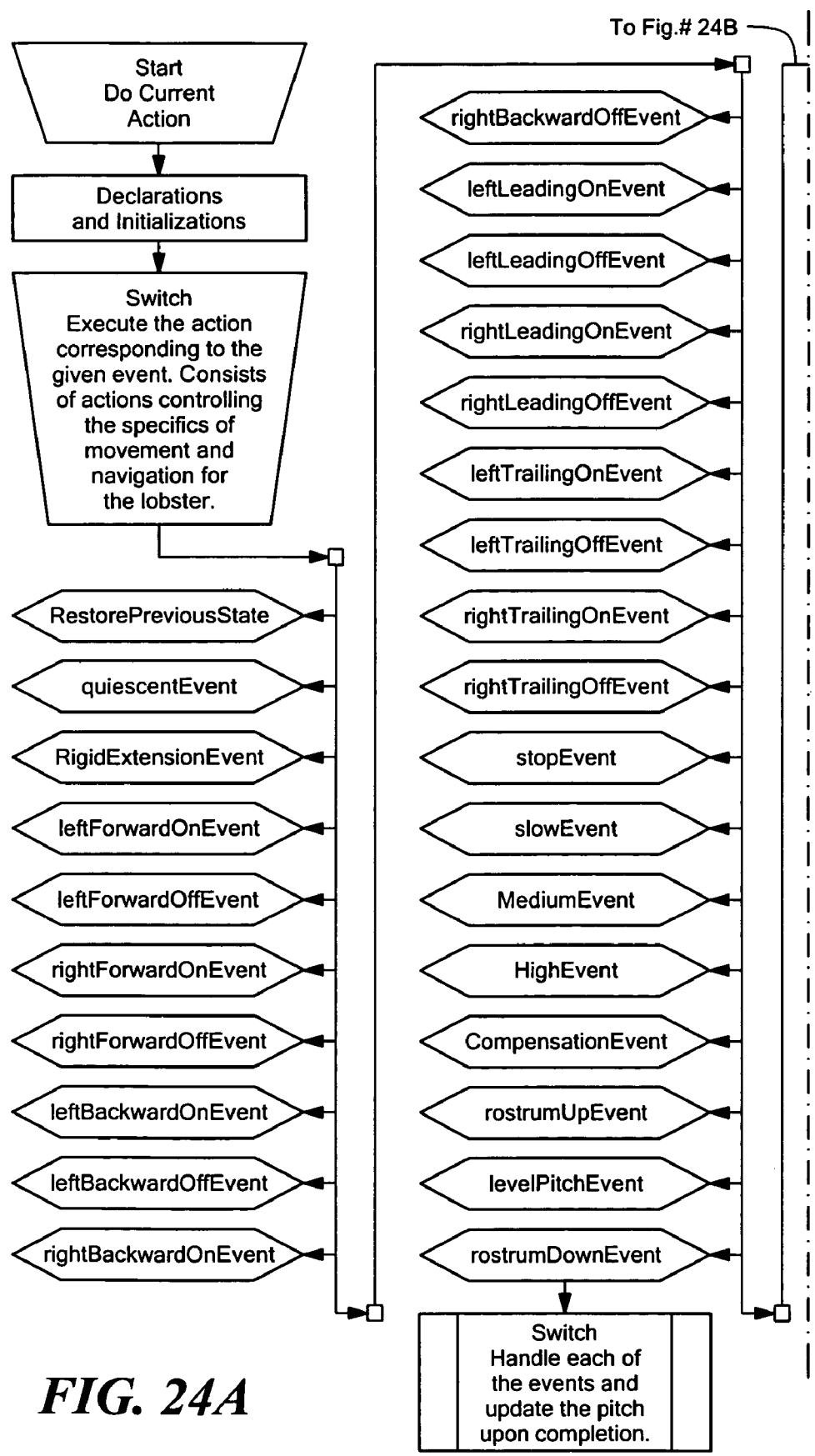
Figure 24B:
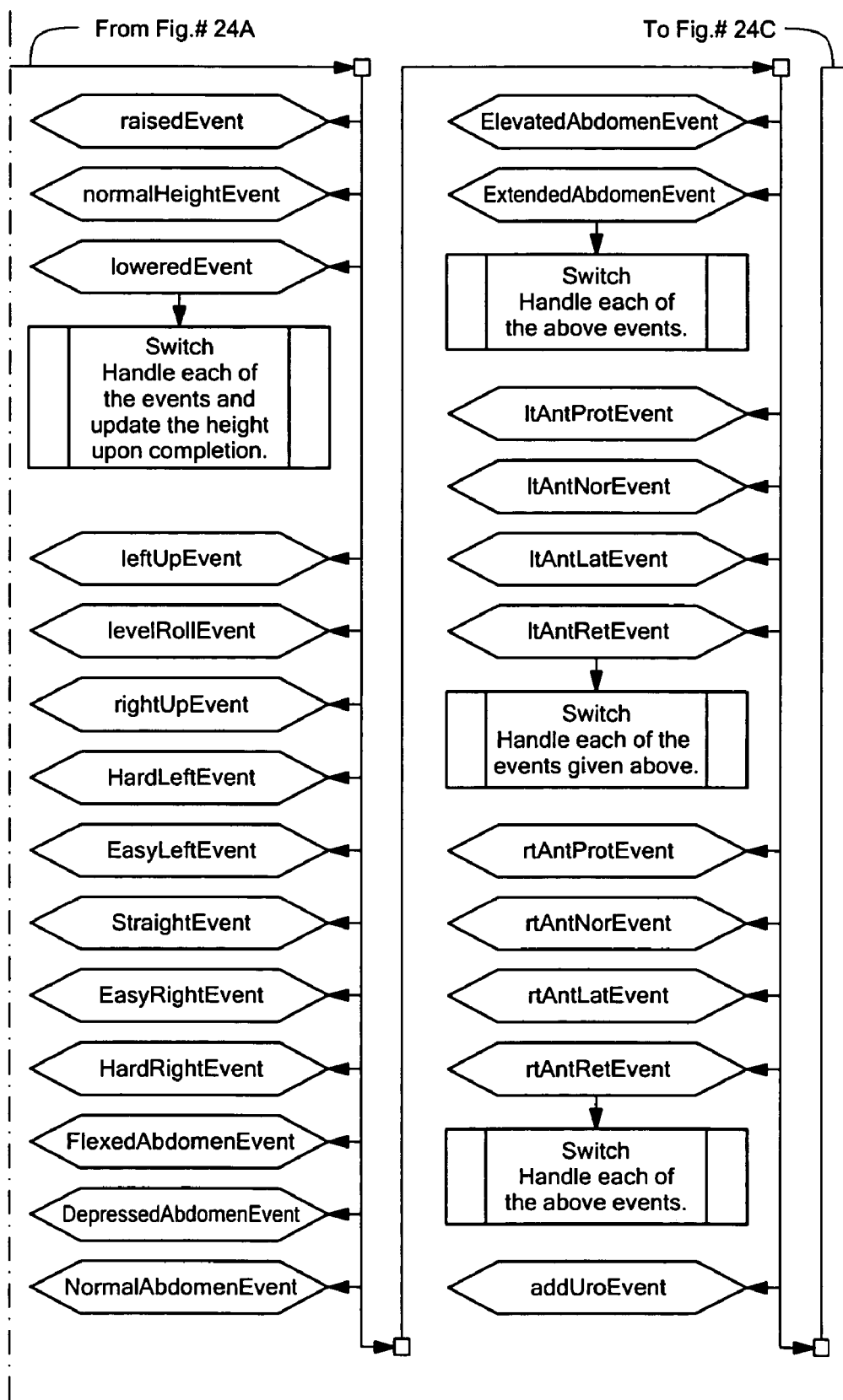
Figure 24C:
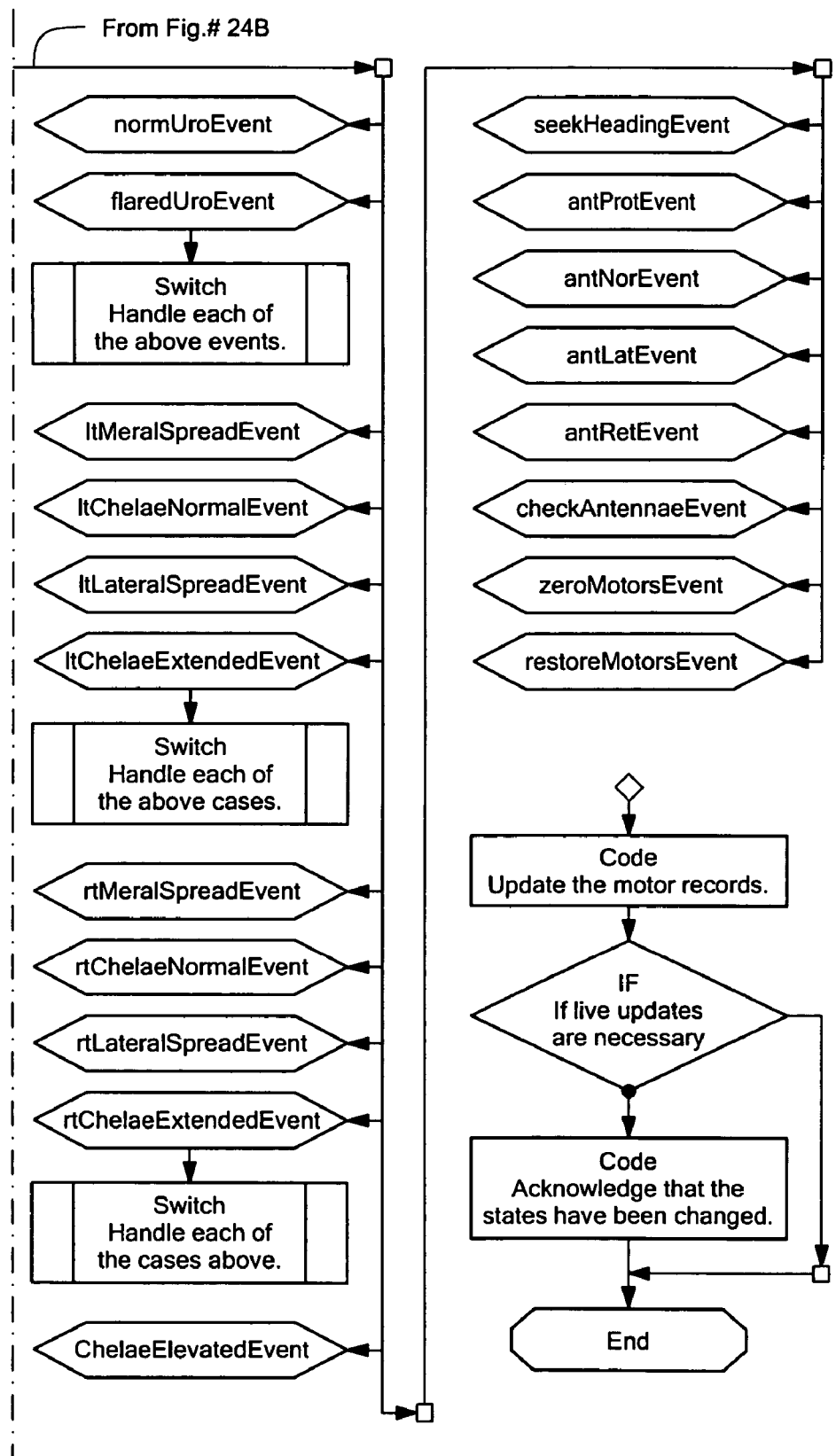

Many behavioral sequences are complex and involve both fixed duration epochs as well as variable duration epochs that require sensor feedback to terminate. Such complex sequences are preferably implemented using linked lists, as shown in FIGS. 12 and 24. Goal achieving subsequences maintain ongoing states until a defined result is achieved (e.g., turning to a particular compass heading). Achievement of the goal triggers the next subsequence in the list.

a. Leg State Machines

Figure 14:
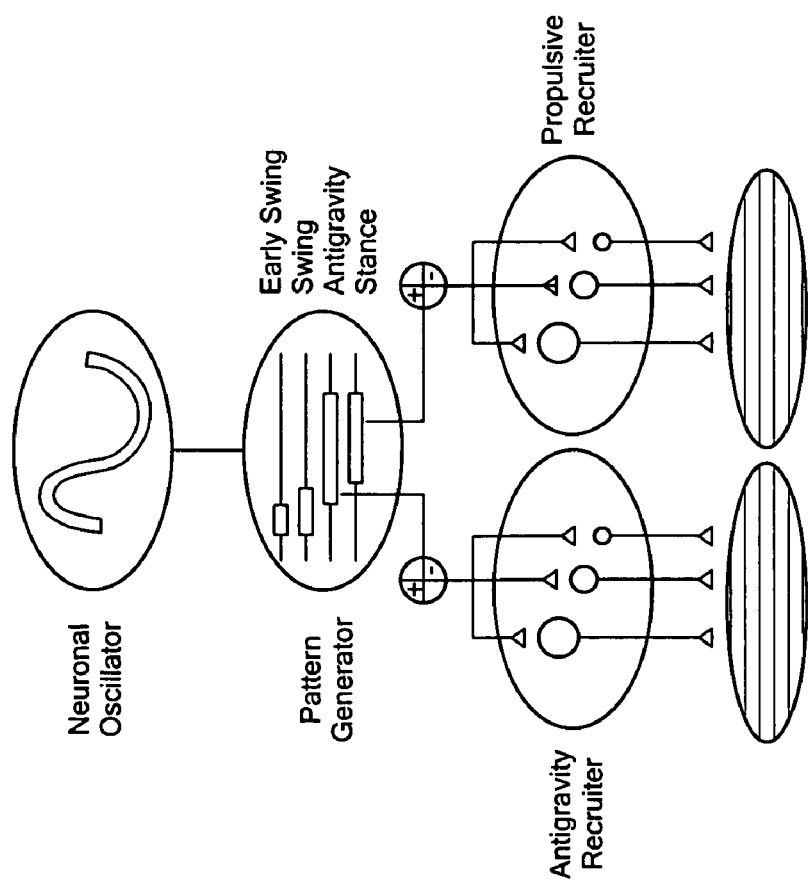
FIG. 14 illustrates the functional organization of a leg state machine for the robot of FIG. 1.

A finite state machine that operates each leg controls the actuators associated with different muscles. As illustrated in FIG. 14, the state machine generates a four-element pattern that includes the elevators, protractors, depressors and retractors for forward walking and extensors and flexors during lateral walking.

There are three levels in the organization of this exemplary state machine. With respect to FIG. 14, the top level is the neuronal oscillator or clock of the step cycle. The oscillator divides the step cycle into the four basic elements (top). The step cycle is divided into a swing phase and a stance phase that alternate. The shape of the oscillator pattern defines the duration of the four elements. The synergies that control the coxobasal (CB) joint occupy the early swing (elevation and depression) and the antigravity (depression) phase of the cycle. The propulsive force muscles are active in either the swing phase or stance phase depending on the direction of walking. For each muscle, activation is divided into three epochs: (1) an early heating phase where the muscle is recruited at high duty cycle to initiate contraction; (2) an intermediate phase when the muscle is recruited at the level specified by the desired depression or speed of walking; and (3) a cooling phase where the conversion from austenite to martensite is initiated.

During operation, the real-time kernel checks each leg during each cycle of the real-time loop to determine whether a state change is scheduled and if so passes a message to the next level of the central pattern generator (CPG). Whenever the oscillator schedules a new step it checks the phase of adjacent legs (contralateral and anterior or posterior depending on the direction of walking) and if the phase of such legs is beyond 15% of their expected phase (0.4 for adjacent legs, 0.5 for contralateral legs) the phase of the governed legs is reset. This function mediates the inter-leg coordinating function and maintains the walking gait.

The pattern generator coordinates the pattern of individual leg joint movements that determines the direction of walking. Whenever a leg changes state, an LUT specifies the particular pattern of actuator on/off transitions appropriate to the direction of walking. These transitions are contingent on several internal state variables such as the overall intensity of the behavior, the walking speed, and the desired height, pitch and roll of the vehicle.

b. Electro-Mechanical Tuning

Extensive analysis is performed to match the leg control parameters in the software with the mechanical responses of the leg system. This is established by motion analysis of the legs while going through the parameter space. The basic parameters being altered are the timing of contractions during different phases of the step cycle (e.g., early swing, late swing, and stance) and the duty cycle of the control signal. The movement of the leg tip is measured as a response to altering parameters. The process is repeated until no further improvement is realized.

Figure 15:
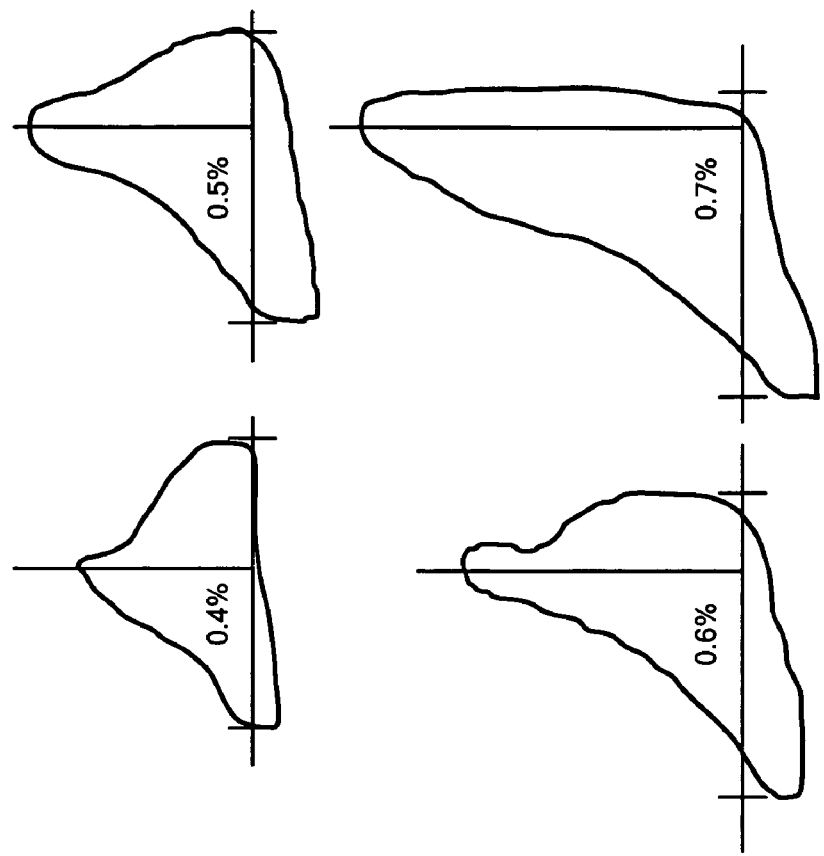
FIG. 15 illustrates the X-Y deflection of a leg tip of the robot of FIG. 1 with different temporal sub-command combinations.

In FIG. 15, the movement of a leg tip on the X-Y plane is plotted for various temporal proportions of early swing/late swing during the swing phase. All tracks are drawn in the same scale, and show the increased elevation as the early swing (i.e. simultaneous elevation and protraction) is lengthened as late swing (i.e. depression and protraction) is shortened.

c. Adaptive Reflexes

Real lobsters modulate their on-going behavior through exteroceptive reflexes that respond to changes in the animal's orientation relative to gravity, bumps, responses to antennal sweeps and angular and translational accelerations. The robot features a sequencing architecture that allows multicomponent sequences.

For example, rheotaxic behavior involves three subsequences: (1) lowering the body and spreading the claws; (2) rotating into the current detected by symmetrical deflection of antennae held laterally to the body; and (3) pitching forward, pitching claws down and tail up to produce a force vector into the substrate and proceeding forward with a load compensating gait.

The first and third elements of this sequence are fixed in duration. The major variable is the second element that actually involves iteration on a goal. These behavioral sequences are grouped in a list of behavioral state tables. During modulation of a sequence, the sequencer pushes the first table into the list and when it completes places the second table on the list, etc. In the case of goal achieving sequences, the sequencer sets the appropriate state variables (e.g., walking forward on one side and backward on the other to rotate into the flow) and a desired goal (e.g., a symmetric lateral deflection of the antennae), wherein the next state table in the list is triggered when that goal is achieved.

The behavior of the robot also includes a taxic component superimposed on the behavioral sequences. For example some sensors act directly on command neurons through exteroceptive reflexes.

Figure 16A:
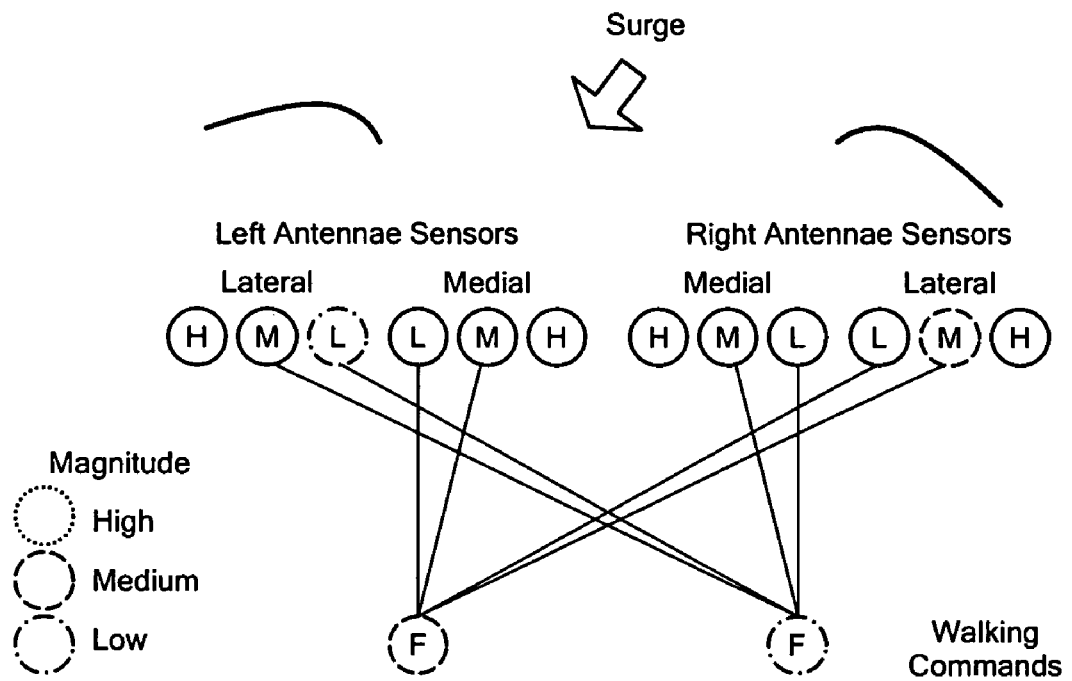
FIGS. 16A and 16B illustrates exteroceptive reflexes mediating rheotaxic response to asymmetric flow and surge, respectively, in the robot of FIG. 1.
Figure 16B:
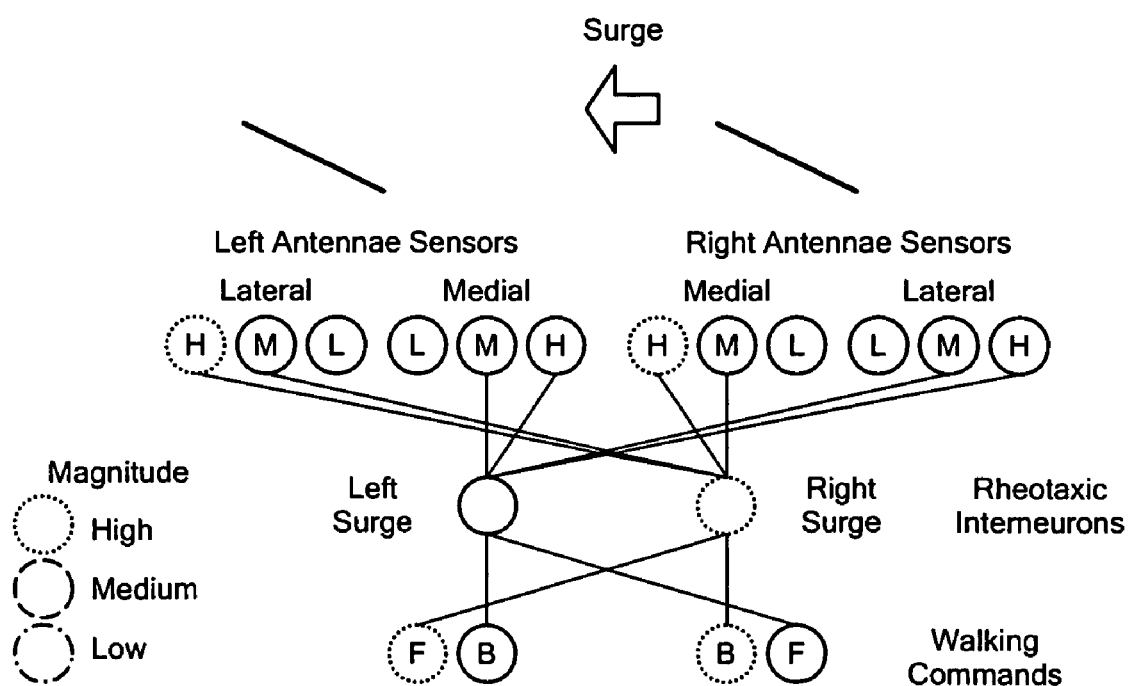
Figure 25:
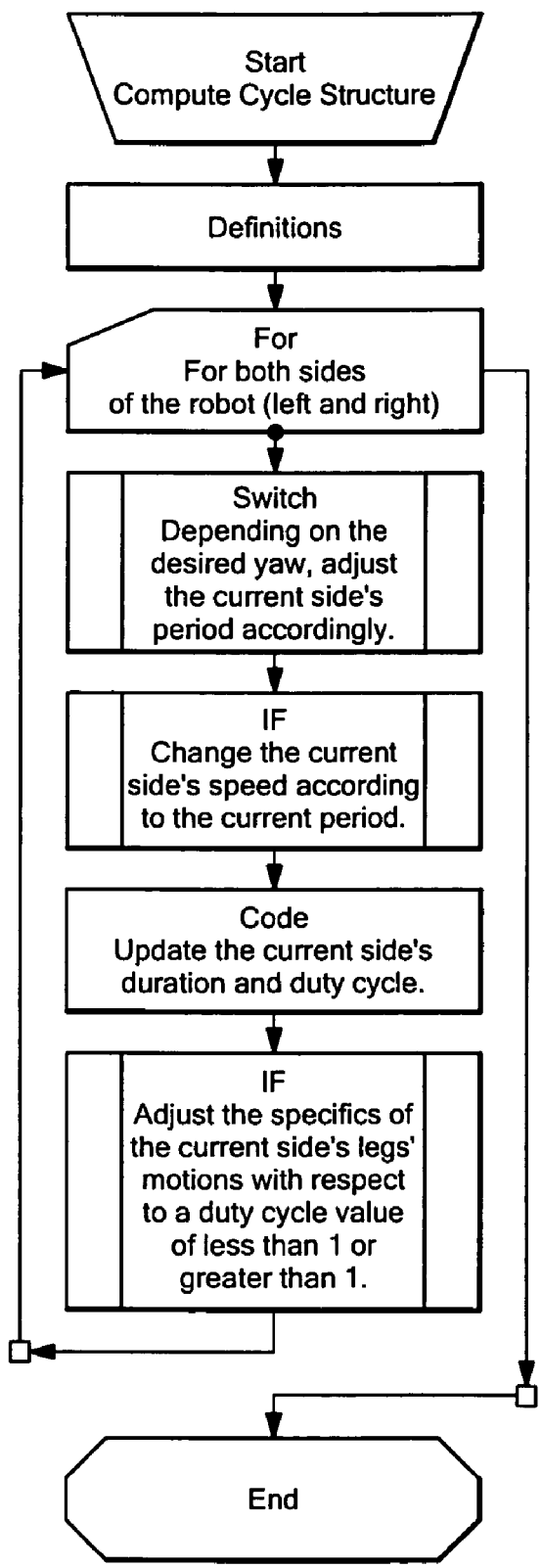
FIG. 25 illustrates a command sequence for implementing a behavioral response to a sensor-detected condition in the robot of FIG. 1.

In FIGS. 16A and 16B, exteroceptive reflexes are shown mediating rheotaxic responses to asymmetric flow and surge. Specifically, in FIG. 16A, an asymmetric flow registers as a low magnitude lateral force in the left antenna lateral sensor and a medium magnitude lateral force in the right antenna lateral sensor. The appropriate behavioral response is then implemented—i.e. left side walking at medium intensity and right side walking at low intensity. FIG. 25 illustrates a command sequence necessary for achieving the desired behavioral response to the detected flow. Similarly, in FIG. 16B, a surge from the right is detected as a high magnitude lateral force by the left antenna lateral sensor and a high magnitude medial force by the right antenna medial sensor. The rheotaxic interneuron for a right surge is identified, and high intensity forward movement results on the left side, while high intensity rearward movement results on the right.

d. Supervised Autonomy

Figure 26:
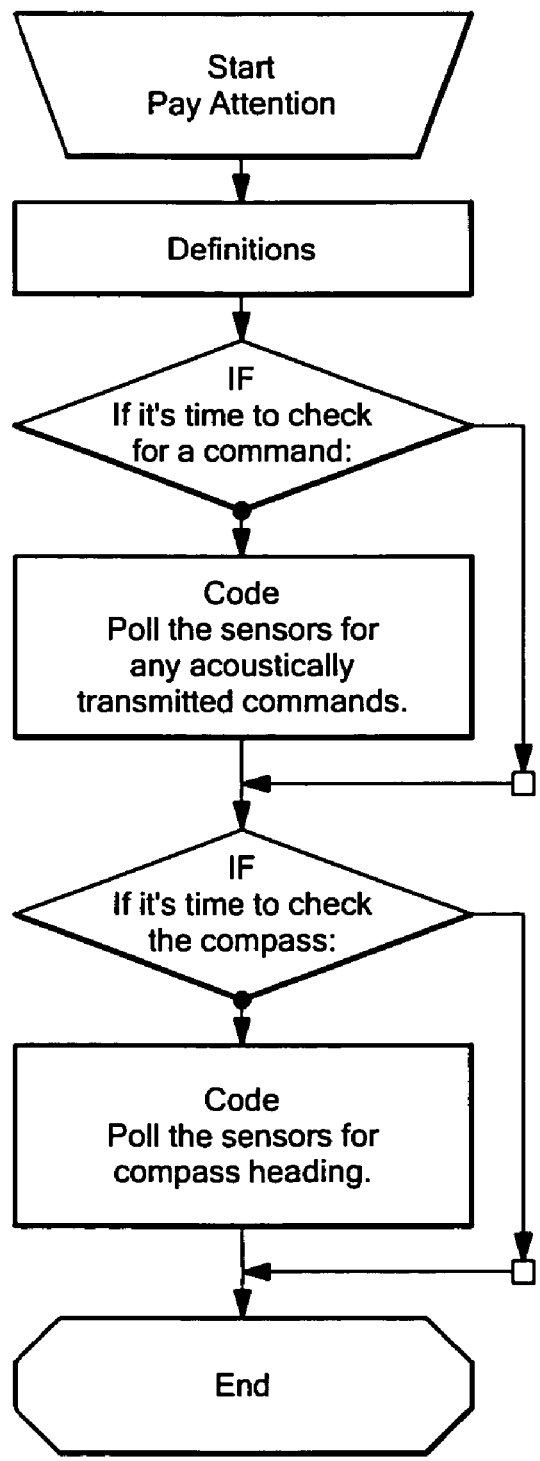
FIG. 26 illustrates a command sequence for enabling the robot of FIG. 1 to respond to externally received commands.

The vehicle is intended to operate autonomously while supervised by sonar commands from an operator. In other words, an operator can give the vehicle high order commands but the reactive behavior relative to environmental contingencies is autonomous. FIG. 23 illustrates a wake-up sequence performed by the controller. FIG. 26 illustrates a command sequence executed by the controller to enable responsiveness to external commands.

Figure 17:
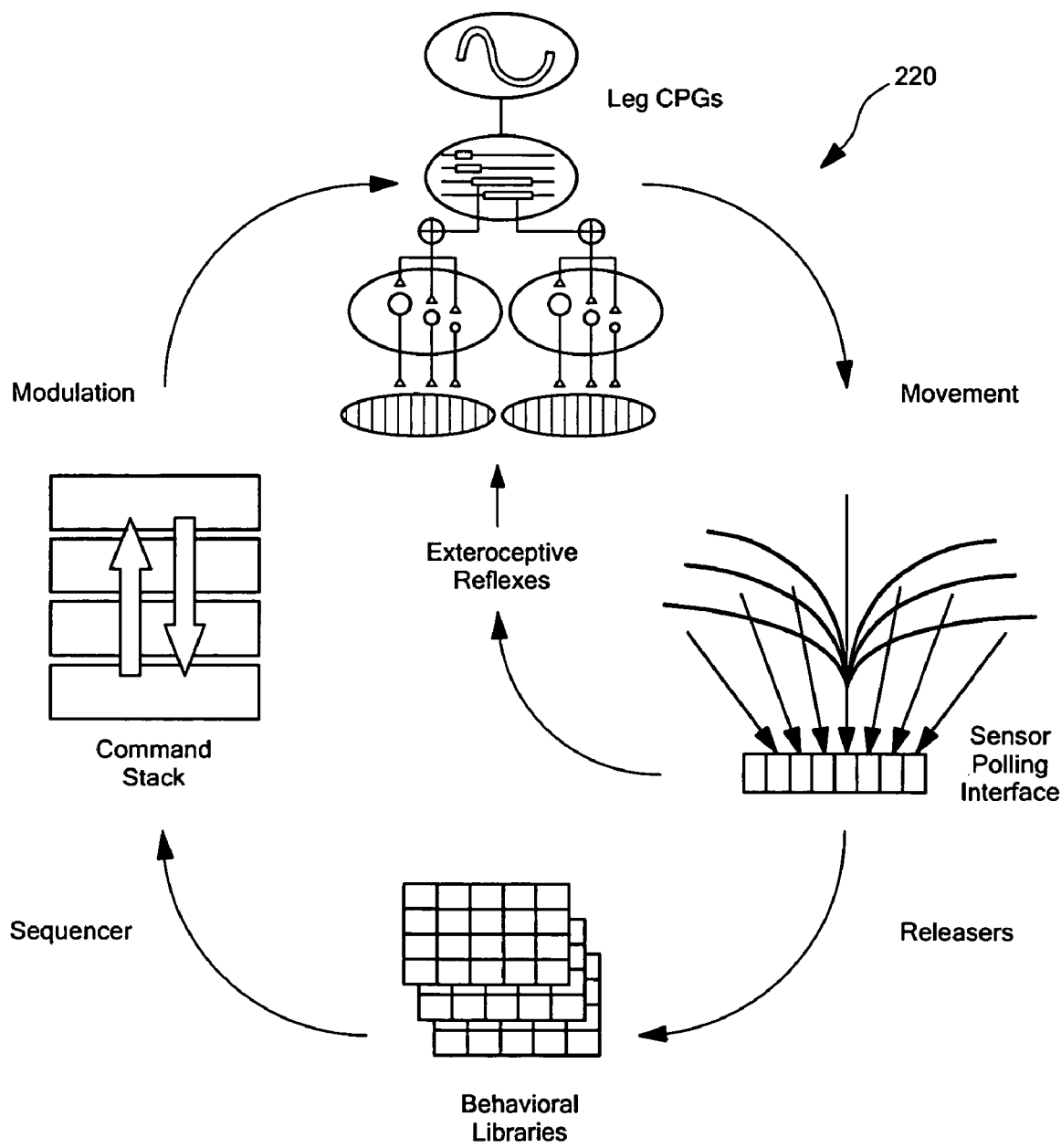
FIG. 17 illustrates the control loop implementing reactive behavioral autonomy in the robot of FIG. 1.

As illustrated in FIG. 17, the autonomous capabilities are maintained by an event loop 220 that nests both behavioral sequences and exteroceptive reflexes. The actual movements of the vehicle are generated by a set of state machines that control the legs, claws, tail and antennae. These actuators generate movement and collisions that are sensed by the sensor polling interface. Returned sensor data are subjected to bit mask filters that detect behaviorally significant releasers. The releasers push evoked behavioral sequences onto an event or command stack. The stack pops events that modulate the state variables of the state machines. As shown, certain sensor inputs represent exteroceptive reflexes, which are used to modulate the state machine variables without directly altering the command stack contents.

Figure 18:
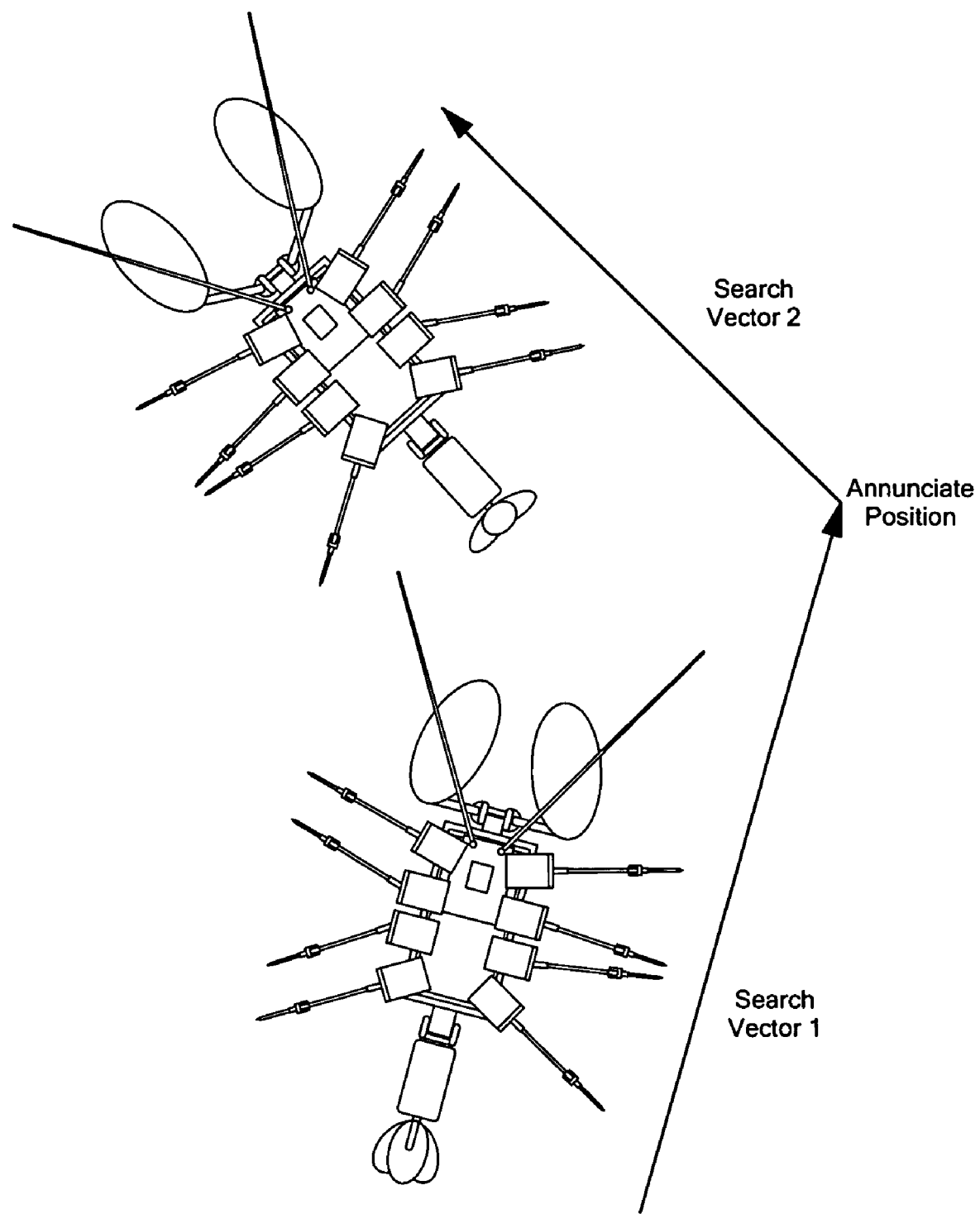
FIG. 18 illustrates autonomous vectored locomotion in the robot of FIG. 1.

During operation the vehicle can be deployed on search vectors. As suggested by FIG. 18, a compass heading and a period of time to locomote on that heading will specify each search vector. During execution of the search vector, the vehicle will be given a propensity to investigate or negotiate objects which it encounters. This propensity will be a scalar from 0.0 to 1.0. In the case of an ambulatory lobster-based robot used for mine detection, the propensity to investigate will be determined by the proximity to suspected mine candidates at the initiation of the vector.

(3) Myomorphic Actuators

The effectors (i.e. legs and/or body axis), control surfaces and adaptive sensors are actuated by myomorphic actuators composed of artificial muscle, which in an exemplary embodiment is nitinol. Sequential recruitment of control synergies produce graded forces by the size principle of neuromuscular recruitment. This recruitment is implemented with shape memory alloy (SMA)-based actuators, but it could be realized by a variety of actuator technologies.

In the case of nitinol, wire treatment is necessary to remove an oxide coating that results from the annealing process. In addition, there is a tendency for seawater to infiltrate the TEFLON sleeves over extended periods of operation. Paired groups of identical SMA actuators are assembled and trained, one being maintained as a control and the other treated, such as with acid or abrasive. Comparison of the following parameters indicate that acid bath treatment improves the overall performance of the SMA: rise time (time zero to full contraction), linear strain, resistance (pre- and post-training), and average power. Significant discrepancies in rise time were found between sand and acid treatment, and wet and dry modules.

Figure 10:
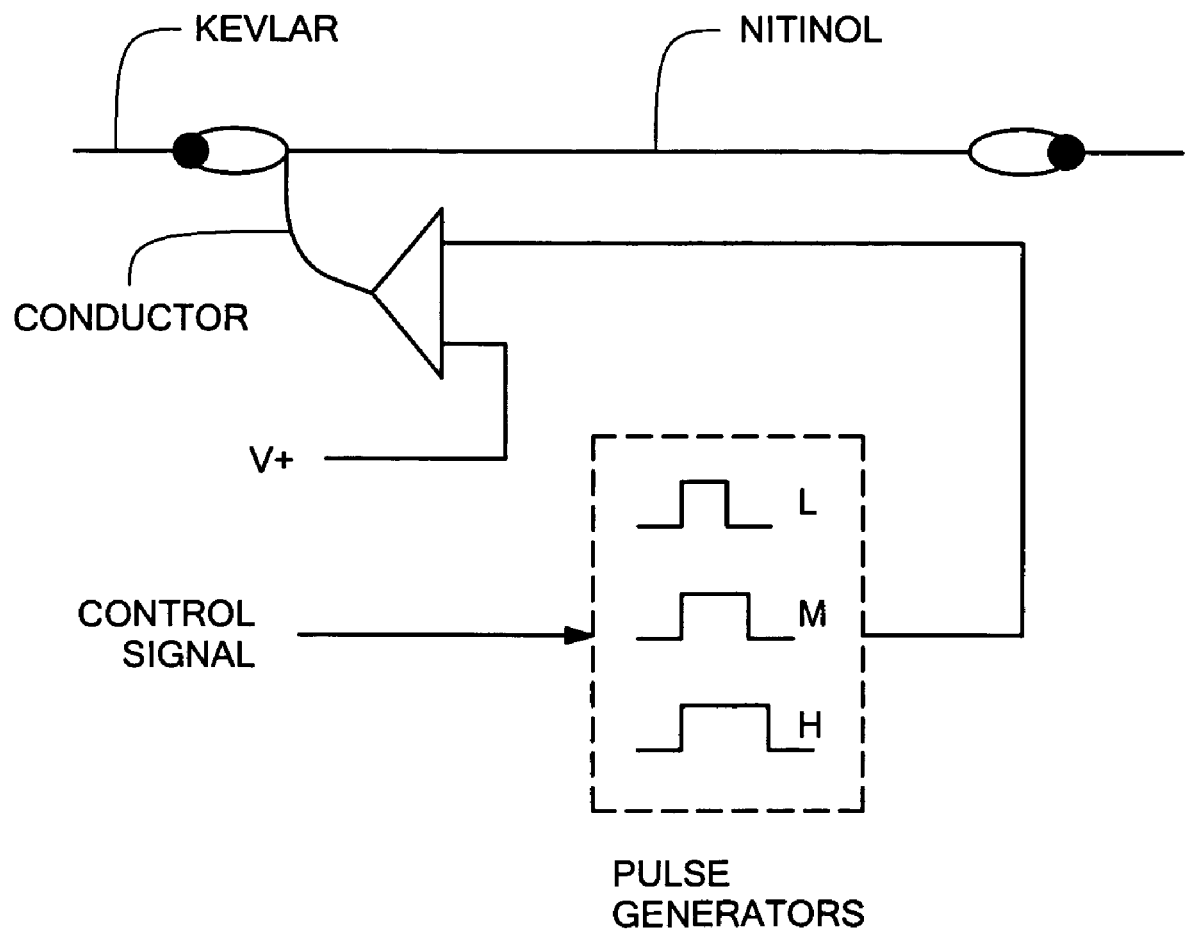
FIG. 10 is a schematic view of the actuator system of FIG. 9.
Figure 19:
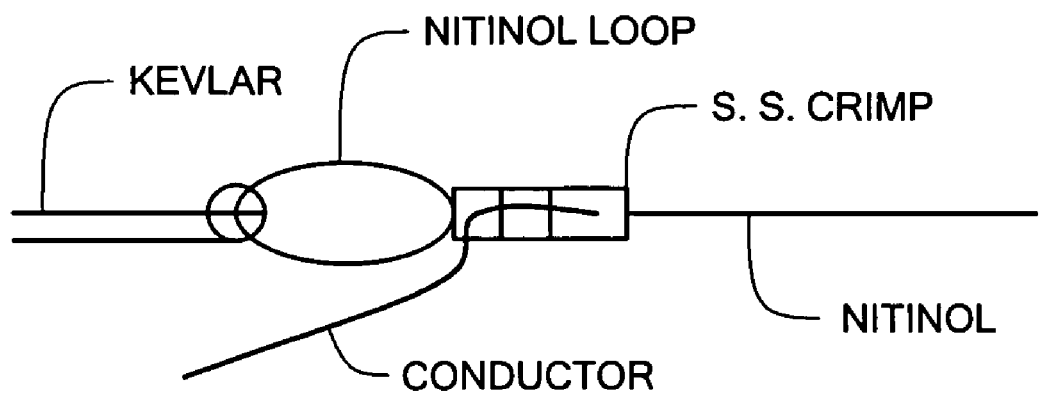
FIG. 19 is a detailed view of one portion of the actuator system of FIG. 10.

To address the issues of variable actuator performance due to water inundation and frequent failure of the KEVLAR (E.I. du Pont de Nemours and Company Corporation) attachment points, a nitinol crimp assembly is used. Initial testing has shown the design to be durable with no water ingress. As shown in FIGS. 10 and 19, the design uses a single crimp of material such as stainless steel (S.S.), onto which an electrical conductor is soldered. The nitinol wire is passed through the stainless steel crimp, and doubled back into the crimp to form a loop. After crimping, the KEVLAR strand is attached to the nitinol by a simple hitch. This design eliminates the need to crimp the KEVLAR leads to the nitinol, a situation that has caused most observed muscle module failures. The observed failures involved both slippage of KEVLAR and the severing of the KEVLAR inside the crimp, both due to the relative softness of the KEVLAR strand.

Water ingress into the module has been eliminated by using an etched TEFLON tube, to which a number of sealing compounds adhere well. The tube is supplied by Zeus Industrial Inc. (Orangeburg, S.C.), whose proprietary etching technology creates a porous surface to the TEFLON while also altering the chemistry of the outer surface of the TEFLON to become chemically more reactive and receptive to bonding. The final step in the module assembly process is to coat the exposed crimp assembly with a urethane coating and to slip a length of 8 mm PVC heat-shrink tubing over the entire assembly.

An integral part of the module assembly system is the use of a pneumatic crimping system. A die produces consistent results and gives the necessary breakage strength to the crimp.

(4) Neuromorphic Sensors

The sensors used in the robots produce a labeled-line code based on sensor modality and receptive field and range magnitude fractionation of the modality, such that different labeled-lines code input of different amplitudes. These sensors use both Micro-Electro-Mechanical Systems (MEMS)-based technology and combinations of analog sensors with a microcontroller that quantizes the input.

Figure 20:
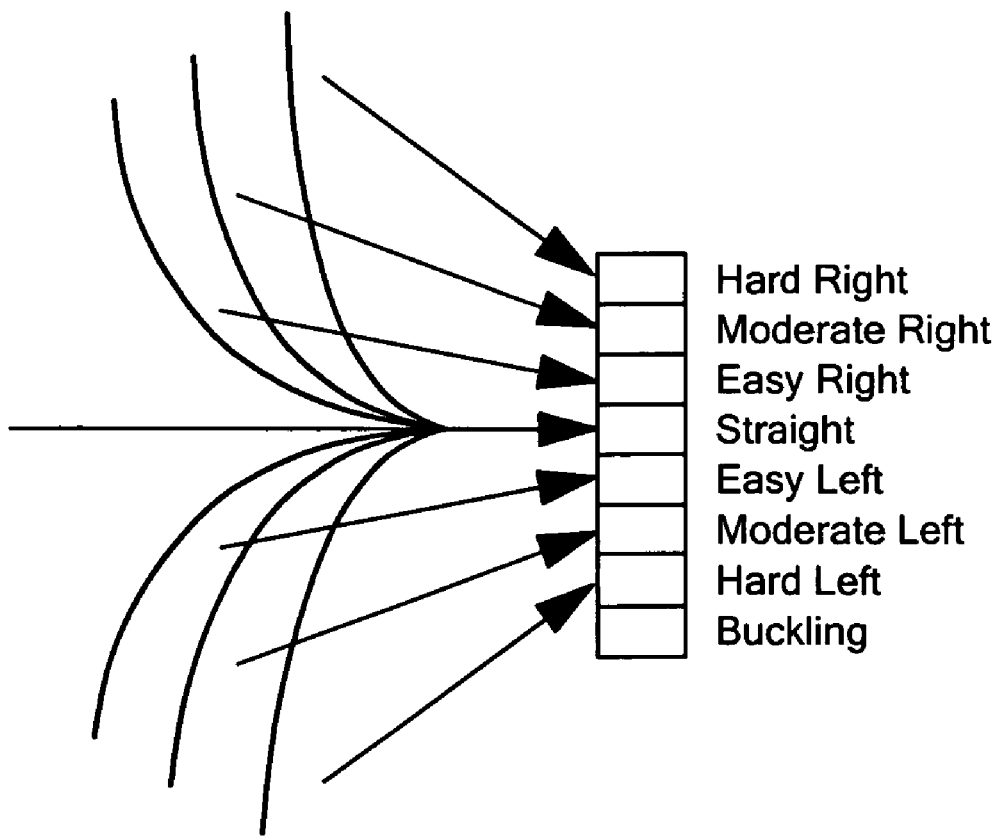
FIG. 20 illustrates a byte mask for antennal sensors for the robot of FIG. 1.

In order to realize functional antennal sensors, strain gauges (not illustrated) are used to monitor bending. The strain gauge is mounted in the middle of the antennae and interfaced to the motor-driver board using a Wheatstone Bridge circuit. A PIC microcontroller digitizes the analog signal and discreetizes it to an eight bit labeled line code. Each of the bits represents one of the eight states depicted in FIG. 20.

A pair of anterior-mounted 10" flexible polyacrylate tactile antennae are used on the illustrated lobster system. These antennae can be projected at four different angles depending on context. They are capable of distinguishing water currents from collisions with solid objects such as rocks. The byte masks associated with the two antennae must be interpreted in the context of the position of the antennae relative to the hull. For example, the buckling bit can be set by a head-on collision if the antennae are projected forward or by a collision to either side if they are projected laterally. Thus, identification of releasers requires that the returned data are interpreted through a decision tree based on the position or movement of the antennae. Responses must also be interpreted in the context of movements between positions that can bend the antennae.

As noted with respect to FIG. 1, the antennae 60A, 60B are controlled by a motor drive 62 which allows them to sweep over arbitrary ranges between four basic positions. If the antennae collide with an object in a sweep range it will indicate bending by the magnitude of sensor flexion. One of the additional characteristics of the underwater operation of these sensors is that they buckle when they make a head-on collision with an object. This is associated with a rapid left-right bend of the antennae. The PIC microcontroller is programmed to recognize such events and sets the eighth bit for each antennae for 150 msec following such collisions.

The antennae 60A, 60B have been calibrated in a laminar flow system such that they can also be used to indicate water flow, both in terms of direction and magnitude. For example, if the antennae are statically projected forward and both are bent to the right this would indicate flow from the left. If the antennae are projected statically laterally, they become a flow sensor for anterior originating currents and can indicate when the vehicle is oriented into flow or surge on the basis of symmetric deflections on both sides.

Pitch and roll inclinometers 26, 28, each having an eight bit labeled line code for each of pitch and roll over a +/−8° range relative to horizontal, are used in the illustrated system. A flux gate compass 24 has an interface that provides three bits of resolution (i.e. eight heading sectors—N, NW, W, SW, S, SE, E, NE).

(5) Reactive Autonomous Behavior and Behavioral Libraries

The basic premise of biomimetics is that the vehicle can achieve the performance advantages that the animal model enjoys in the natural environment by mimicking the behavior of the model. The approach to achieving the behavioral repertoire of the lobster is to base the vehicle control architecture on the prevailing neuronal network model of the motor systems, the command neuron, and the coordinating neuron central pattern generator architecture.

The fundamental assumption of this behavioral control model is that the posture and action of the different body parts is specified by a set of command systems that command the task group to generate a different state. Thus, the task of deriving the underlying behavioral scripts is to specify the state of the task groups in each of the frames of a movie of the model animal performing the act that one wants the vehicle to mediate. The following set of states are adequate to define the ongoing behavior of both the lobster and the biomimetic robotic vehicle.

Figure 21:
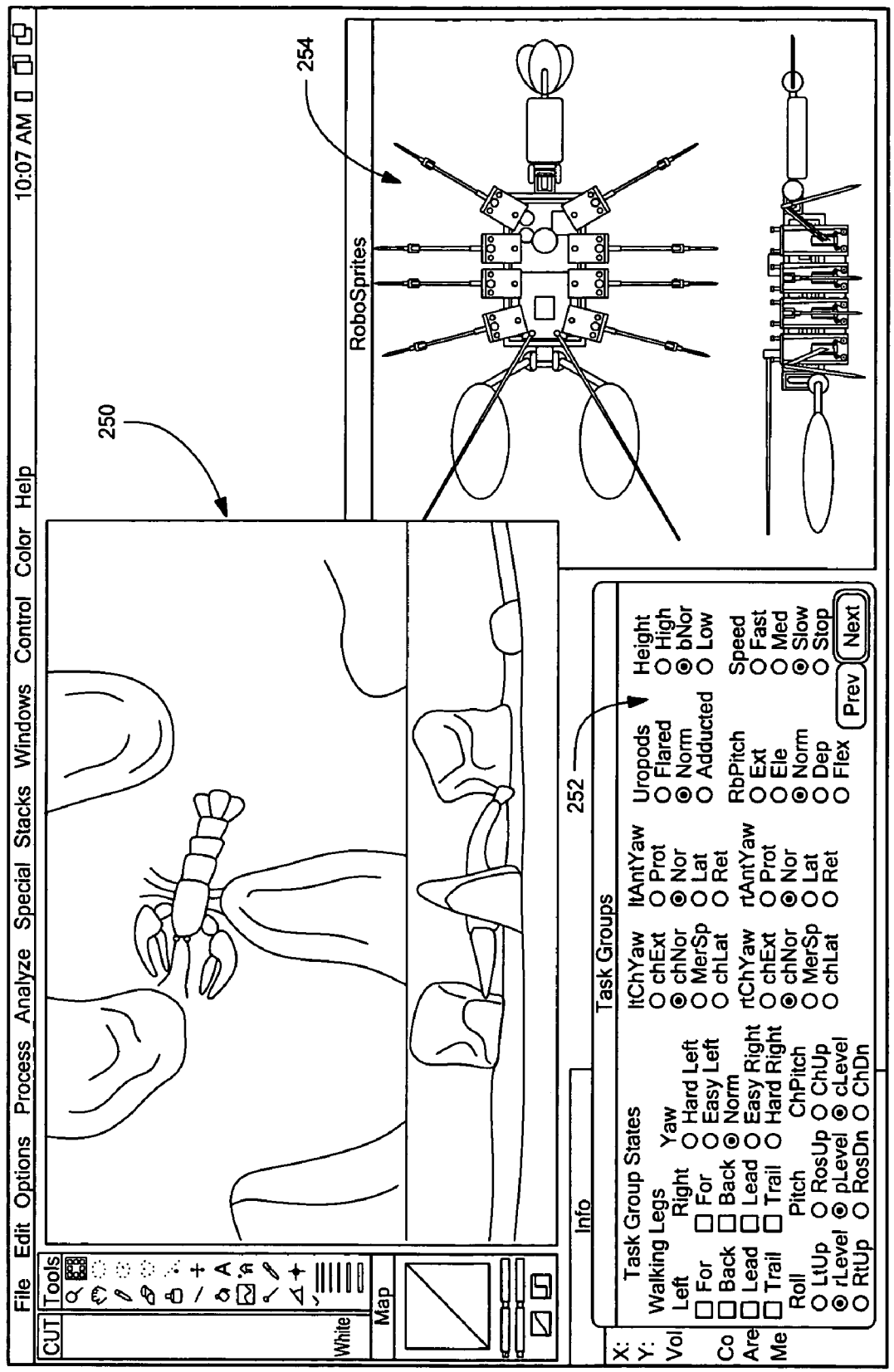
FIG. 21 illustrates an exemplary display screen for a software tool enabling the development of robot behavioral sequences premised upon animal behavior according to the principles of the presently disclosed invention.

Thorax Pitch: rostrum up, level, rostrum down
Thorax Roll: left up, level, right up
Thorax Yaw: hard left, easy left, straight, easy right, hard right
Thorax Height: high, normal, low
Walking direction: standing, forward, backward, lateral leading, lateral trailing
Walking speed: slow, medium, fast, stop
Claw Pitch: up, normal, down
Claw Yaw: extended, normal, meral spread, lateral spread
Antennae Yaw: protracted, normal, lateral, retracted
Uropod Posture: flared, normal, adducted
Abdominal Pitch: extended, elevated, normal, depressed, flexed To derive robotic control sequences from video data of the subject animal, finite state analysis of task groups that mediate locomotion is performed using a software tool such as ColorImage, developed by the Marine Science Center of Northeastern University, East Nahant, Mass. An exemplary display of such a program is shown in FIG. 21. The video frames 250 are searched individually to abstract command states and to determine which synergistic sets are operant during different behavioral acts. This analysis of the sequencing of task groups borrows from a technique utilized by astronomers to detect motion of objects such as comets. As the analysis proceeds through each frame of the digital movie, the program flashes between temporally adjacent frames with a brief pause after each cycle. Appendages that are moving the most flash in these projections. A panel of buttons 252 that represent different states of the task groups (e.g., elevation versus depression of the chelipeds, etc.) are available to the investigator to specify which groups are active. By clicking on the appropriate buttons for each frame, it is possible to efficiently quantify the activity of all task groups at high temporal resolution from video recordings of specimens behaving in a variety of situations. A display 254 of the vehicle with the selected state active may be displayed for reference purposes. These state change sequences constitute the behavioral library of the vehicles.

Figure 22:
FIG. 22 depicts a table of behavioral sequences compiled using the software tool of FIG. 21.

A behavioral editor that allows one to refine the behavioral state tables 256, shown in FIG. 22, is also used to generate standard behavioral sequences that are then stored in the memory of the vehicle. Each behavioral sequence is associated with a unique releaser that triggers it in response to the right environmental contingencies.

Alternative embodiments to the presently disclosed robots include the incorporation of a low-power acoustic modem and embedded signal processing platform, such as the Woods Hole Oceanographic Institution (WHOI) Micro-Modem, into the vehicle to allow integrated control and navigation. A supervisory acoustic communications-based operator interface can also be provided that will allow waypoint navigation and supervision of ongoing search and investigation. This navigation improvement is used to train the systems to achieve the capability to mediate coordinated autonomous search in regions of bottom clutter and conduct homing operations on a sonar beacon.

By developing a set of investigatory and reporting behaviors, identification of and response to sensed objects can be achieved. This functionality may require the incorporation of additional sensors, depending upon the mission requirements. For example, optical flow chips such as those produced by CentEye (Washington, D.C.) to instantiate optomotor reflexes in the robots.

As an alternative to the nitinol SMA actuators, the Honeywell PolyMEMS Actuator, a polymer-based MEMS microactuator with macroscopic action, may be utilized to implement muscle in adapting robot systems to land. Further, the neuronal networks that underlie the presently disclosed finite state machine controller could be implemented with the Hindmarsh-Rose electronic neurons of the University of California at San Diego Institute for Non-Linear Science.

Commercial applications for the presently disclosed biomimetic robots includes remote sensing and mine countermeasures in the littoral zone of the ocean and/or rivers and streams. The vehicles may be delivered in torpedo cache systems or from small craft to an area to be investigated and cleared. The overall scenario is for the robots to achieve a comprehensive search of a mine candidate area using a swarm of autonomous vehicles. The set of behavioral acts that a lobster employs to search for food is exactly what a mine hunting robot needs to perform to localize and identify mine candidates. Thus, the behavioral set of these vehicles is beneficially derived directly from reverse engineering of the behavioral sequences of real lobsters. Additional embodiments of these robots rely on electro-optical imaging as well as near-field queues, which are primarily tactile, and chemical detectors in the localization of mine candidates. By using swarms of the vehicles, the probability of collision with mine candidates is maximized.

The vehicles performing such tasks operate as supervised autonomous agents in a landing lane delineated by a stand-off lane marking system based on sonobuoys and acoustic modems, or alternatively on the basis of satellite positioning systems such as GPS in the case of tethered vehicles towing floats. The role of the lane marking system is two-fold: (1) to constrain the search within the candidate landing zone; and (2) to supervise the search activities to insure complete coverage. A master controller supervises the movement of the vehicles and maintains a record of the tracks of the vehicles. The controller uses this record to constrain the movements of the vehicles to insure a complete search pattern, though the search will be random at the level of the individual vehicles. As the operation proceeds, the supervisory system will influence the vehicles to insure complete coverage of the landing lane.

Ambulatory vehicles can be used for searching the bottom while undulatory vehicles can be used for searching the water column. The landing lane will be delineated by a set of four sonobuoys that are equipped with high frequency transponders. During initiation of a search, the vehicles will initiate a search segment on an arbitrary heading, and then annunciate a current position, allowing the master controller to use the acoustic cues to localize the position of the vehicle. When the position is determined, the vehicles will be given a heading and an arbitrary length of time to walk on that heading. At the end of that time period, the vehicle will announce completion of that segment of the search (see FIG. 18). This search segment procedure will repeat to allow comprehensive coverage. As the search proceeds the record of search paths will be used to determine regions of low search coverage and the controller will direct additional search segments in those areas in a probabilistic fashion.

Such an algorithm assumes that the behavior of the robot is autonomous during a search segment and that the competencies of the vehicle allow it to deal with environmental contingencies. Such obstacles might include uneven substrates, rocks, boulder fields, shoals, wave surge, tidal currents, algal beds, etc. The vehicle will have the overlying motivation to navigate on a specified compass heading. When it encounters an obstacle, the robot will attempt to ascertain whether it is a mine candidate or not.

There are numerous types of sensors that can be used for mine identification currently under development including electronic noses, acoustic hardness testers and active electric field perturbation sensors. The investigative behaviors adopted from lobsters will insure that the sensors can be both brought into adequate proximity and be deployed from all orientations relative to the mine candidate. If the vehicle determines that the obstacle is not a mine candidate it must make the decision whether to climb over the obstacle or to transverse around it. The vehicles will use a combination of antennal sensors and claw like surfaces to ascertain whether climbing is feasible. Where climbing is unfeasible the vehicle will use a wall following algorithm to locomote around the obstacle until it can resume its predetermined heading.

This basic scenario will apply to almost all sea floor types. Where the substrate slopes the vehicle will rely on orientational reflexes to maintain stability in the pitch and roll planes. The vehicles are able to streamline their claw like control surfaces to allow them to plow through algal beds. Operation in the littoral zone or in rivers will require adaptations to current and wave surge.

The illustrated vehicle embodiment is statically stable in currents up to one knot. When wave surge exceeds these rates and especially when the rate of change of current is high, the vehicles will evoke a sequence of rheotaxic behavioral acts that will serve both to streamline the vehicle as well as insure hydrodynamic stability. These rheotaxic acts will include yawing into the current, pitching the body forward, lowering the claw-like control surfaces and elevating the tail-like control surfaces. Each of these components of rheotaxic behavior will have a defined threshold as perceived by current and shear sensors. Due to a large difference between the center of gravity and center of mass due to the low placement of the batteries, the vehicle is statically stable and self-righting in case of major perturbations.

During investigation the vehicle relies on capabilities for omni-directional locomotion to circle around an object while maintaining sensor suites on the object at close proximity. By performing this procedure, the vehicle can use voting algorithms from different orientations to fuse information about the size, shape, surface properties, and electrical, magnetic or chemical signatures that it may use for identification. Incorporation of the WHOI Micro-Modem referenced above allows the vehicle to telemeter images of a mine candidate for positive electro-optical identification. At the completion of the mission, the vehicles can be commanded to deploy a miniature lift bag to force them to float to the surface where they can be collected for reuse.

The undulatory robot is intended to complement the operation of the ambulatory robots in performing search operations for mine candidates that are suspended in the water column. It will similarly be delivered to the operational theatre by torpedo cache systems or small craft and will be governed in its search behavior by the same lane marking system as the ambulatory vehicle. During searches, the vehicle will navigate on search segments which are specified by a compass heading.

The vehicle can use a sonar altimeter to regulate its altitude to that of suspended tethered mine candidates. While swimming on an arbitrary heading, the vehicle will use high frequency directional sonar to insonify the water in front of the vehicle and listen for sonar returns that indicate a close range object. Since the vehicle will be undulating in the yaw plane, the sonar will be scanning laterally. If the vehicle retains the compass heading at which it generated the sound pulse, it can use omni-directional sonar receivers to correlate the reception of an echo at short latency with the orientation of the transmitter when the pulse was generated. By this mechanism the vehicle will be able to localize the orientation of candidates relative to the vehicle.

While the present invention has been described in conjunction with a preferred embodiment, one of ordinary skill, after reading the foregoing specification, will be able to effect various changes, substitutions or equivalents, and other alterations to the compositions and methods set forth herein. It is therefore intended that the protection granted by Letters Patent hereon be limited only by the definitions contained in the appended claims and equivalents thereof.

What is claimed is:

1. A biomimetic robotic device based on a subject animal, comprising:

a body with an interior body cavity and an exterior body surface;

counterpart physical components to each of identified physical components of the subject animal, each of the counterpart physical components being mechanically coupled to the body and independently actuatable;

at least one sensor for sensing a condition or parameter external to the body surface, labeled line code for correlating each condition or parameter sensed by the at least one sensor with a respective reflex comprised of a physical maneuver or sequence of maneuvers of the robotic device, the physical maneuver or sequence of maneuvers of the robotic device corresponding to an exteroceptive reflex of the subject animal to a substantially similar condition or parameter as sensed by the subject animal, the labeled line code being output by ones of the at least one sensor;

a library of motor command sequence structures characterizing commands for causing sequential changes in the physical orientation of identified counterpart physical components over temporal periods for performing physical maneuvers of the robotic device to provide forward, reverse, and lateral walking capabilities; and a neural circuit-based controller comprising a command neuron object and a memory for receiving the library of motor command sequence structures, the command neuron object being capable of selectively actuating ones of the counterpart physical components in response to selected ones of the motor command sequence structures, wherein input from the at least one sensor acts directly on the command neuron object to autonomously invoke the physical maneuver or sequence of maneuvers of the robotic device corresponding to the reflex of the subject animal to provide forward, reverse, and lateral walking capabilities.

2. The robotic device of claim 1, further comprising a myomorphic actuator system, comprising:
- a strand of shaped memory alloy material having two ends and a central portion, wherein a first of the two ends is disposed proximate the central portion thereby forming a loop;
- a band of electrically conductive material disposed around and physically compressed against the central portion and the first end;
- a strand of light-weight, high-strength, low-electrical conductivity material disposed through the loop for physically interfacing the shaped memory alloy to a structural component; and
- an electrically conductive member disposed in electrical contact with the band, wherein the said myomorphic actuator system actuates the counterpart components when so directed by the controller.

3. The robotic device of claim 1, further comprising:
a polymer-based Micro-Electro-Mechanical Systems (MEMS) based sensor,
wherein the said MEMS-based sensor actuates the counterpart components when so directed by the controller.

4. The robotic device of claim 1, wherein the counterpart components comprise legs.

5. The robotic device of claim 1, wherein the subject animal is a lobster or a lamprey.

6. The robotic device of claim 2, wherein the shaped memory alloy is nitinol.

7. The robotic device of claim 2, wherein the light-weight, high-strength, low-electrical conductivity material is para-aramid fiber.

8. The robotic device as recited in claim 1, wherein the at least one sensor is structured and arranged to provide to the controller sensing data of a reflex acting on external stimuli in response to any change in an orientation or an operating environment of the robotic device.

9. The robotic device as recited in claim 8, wherein the controller is adapted to use the sensing data of the reflex acting on external stimuli to invoke or mediate the respective reflex to cause the robotic device to change its orientation or its posture.

10. The robotic device as recited in claim 9, wherein, when changing its position, movement of the robotic device has a pitch, a roll, and a yaw and the controller is adapted to change the pitch, the roll, and the yaw.

11. The robotic device as recited in claim 8, wherein the controller is further adapted to use sensing data of the reflex acting on external stimuli received during execution of a first, rheotaxic behavioral sequence of movements of the counterpart physical components to cause the robotic device to perform a second, taxic behavioral sequence of movements without interrupting the first behavioral sequence of movements.

12. The robotic device as recited in claim 1, wherein the at least one sensor is selected from the group consisting of a pitch inclinometer, a roll inclinometer, a directional compass, a bump sensor, a positionable antenna, and multiple positionable antennae.

13. The robotic device as recited in claim 12, wherein the controller is adapted to cause the positionable antenna to transition over an areal range to locate obstacles to movement of the device.

14. The robotic device as recited in claim 12, wherein the controller is adapted to measure an intensity and a direction of water flow using the multiple positionable antennae.

15. The robotic device as recited in claim 1, wherein the controller includes a stack-based command sequencer that is structured and arranged to manage a command stack of at least one future behavioral sequence of movements for sequential execution in a temporal order, the command stack being adapted to control variables of at least one of each of the counterpart physical components.

16. The robotic device as recited in claim 15, wherein the stack-based command sequencer is structured and arranged to establish a state change sequence of sequential future behavioral sequence of movements and to mediate between a second behavioral sequence of movements that is incompatible with another behavioral sequence of movements in the command stack.

17. The robotic device as recited in claim 1, wherein the controller includes an attention module that is adapted to perform at least one of:
- maintain discrete polling times for polling each of the at least on sensor;
- perform discrete polling in accordance with said discrete polling times; and
- identify a behavioral state of the robotic device based on a comparison of sensor data with a plurality of behavioral releasers.

18. The robotic device as recited in claim 15, wherein the controller is adapted to generate a plurality of step cycles based on the command stack, each step cycle having at least two swing phases and at least two stance phases.

19. The robotic device as recited in claim 18, wherein the at least one swing phase includes an early swing phase for modifying an elevation or depression of at least one of the counterpart physical components and a swing phase for modifying a propulsion level of the least one of the counterpart physical components and the at least one stance phase includes an antigravity phase also for modifying the elevation or depression of at least one of the counterpart physical components and a final stance phase for modifying a propulsion level of the least one of the counterpart physical components.

20. The robotic device as recited in claim 18, wherein the swing phase and the stance phase alternate during a complete duty cycle such that the early swing phase occurs before or concurrent with the antigravity phase and the swing phase occurs before or concurrent with the final stance phase.

* * * * *

UNITED STATES PATENT AND TRADEMARK OFFICE
CERTIFICATE OF CORRECTION

| | | |
|---|---|---|
| PATENT NO. | : 7,769,487 B2 | |
| APPLICATION NO. | : 10/898673 | |
| DATED | : August 3, 2010 | |
| INVENTOR(S) | : Joseph Ayers et al. | |

It is certified that error appears in the above-identified patent and that said Letters Patent is hereby corrected as shown below:

Column 13, line 22, "+/-8°'" should read -- +/-80° --.

Signed and Sealed this
Third Day of July, 2012

David J. Kappos
*Director of the United States Patent and Trademark Office*